United States Patent
Kang et al.

(10) Patent No.: US 11,194,736 B2
(45) Date of Patent: Dec. 7, 2021

(54) MEMORY CONTROLLER HAVING IMPROVED MAP DATA ACCESS PERFORMANCE AND METHOD OF OPERATING THE SAME

(71) Applicant: SK hynix Inc., Gyeonggi-do (KR)

(72) Inventors: Hye Mi Kang, Gyeonggi-do (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 71 days.

(21) Appl. No.: 16/582,822

(22) Filed: Sep. 25, 2019

(65) Prior Publication Data

US 2020/0226072 A1    Jul. 16, 2020

(30) Foreign Application Priority Data

Jan. 15, 2019  (KR) .................. 10-2019-0005361

(51) Int. Cl.
| | |
|---|---|
| *G06F 12/00* | (2006.01) |
| *G06F 13/00* | (2006.01) |
| *G06F 12/122* | (2016.01) |
| *G06F 12/10* | (2016.01) |

(52) U.S. Cl.
CPC ............ *G06F 12/122* (2013.01); *G06F 12/10* (2013.01); *G06F 2212/1024* (2013.01); *G06F 2212/608* (2013.01)

(58) Field of Classification Search
CPC .................... G06F 12/122; G06F 12/10; G06F 2212/1024; G06F 2212/08
USPC .......................................................... 711/133
See application file for complete search history.

(56) References Cited

U.S. PATENT DOCUMENTS

| | | | | |
|---|---|---|---|---|
| 5,630,088 | A  * | 5/1997 | Gupta ................. | G06F 12/1036 711/207 |
| 6,169,710 | B1 * | 1/2001 | Arai .................... | G11B 20/1879 369/30.11 |
| 9,075,710 | B2 * | 7/2015 | Talagala ................ | G06F 3/0679 |
| 2009/0216936 | A1 * | 8/2009 | Chu ..................... | G06F 12/0246 711/103 |
| 2009/0265503 | A1 * | 10/2009 | Hung ................... | G06F 12/0246 711/100 |
| 2010/0165732 | A1 * | 7/2010 | Lee ....................... | G11C 16/26 365/185.11 |
| 2011/0296133 | A1 * | 12/2011 | Flynn .................... | G06F 3/0619 711/171 |
| 2011/0320684 | A1 * | 12/2011 | Gorobets ............ | G06F 12/0246 711/103 |

(Continued)

FOREIGN PATENT DOCUMENTS

| | | |
|---|---|---|
| KR | 10-2015-0006614 | 1/2015 |
| KR | 10-2018-0016679 | 2/2018 |

*Primary Examiner* — Sheng Jen Tsai
(74) *Attorney, Agent, or Firm* — IP & T Group LLP

(57) ABSTRACT

A memory controller may include a map cache configured to store one or more of a plurality of map data sub-segments respectively corresponding to a plurality of sub-areas included in each of the plurality of areas, and a map data manager configured to generate information about a map data sub-segment to be provided to a host and which is determined based on a read count for the memory device, and generate information about a map data segment to be deleted from the host and which is determined based on the read count for the memory device and a memory of the host.

29 Claims, 17 Drawing Sheets

(56) References Cited

U.S. PATENT DOCUMENTS

| | | | |
|---|---|---|---|
| 2012/0011340 A1* | 1/2012 | Flynn | G06F 12/0292 711/171 |
| 2012/0246393 A1* | 9/2012 | Hashimoto | G06F 12/0246 711/103 |
| 2013/0191601 A1* | 7/2013 | Peterson | G06F 12/0868 711/137 |
| 2013/0346675 A1* | 12/2013 | Yeh | G06F 12/0246 711/103 |
| 2014/0089582 A1* | 3/2014 | Kobayashi | G06F 3/0685 711/114 |
| 2014/0195722 A1* | 7/2014 | Tatara | G06F 3/065 711/103 |
| 2014/0281260 A1* | 9/2014 | Peterson | G06F 11/008 711/135 |
| 2014/0282514 A1* | 9/2014 | Carson | G06F 9/45533 718/1 |
| 2014/0325115 A1* | 10/2014 | Ramsundar | G06F 12/0238 711/102 |
| 2014/0325117 A1* | 10/2014 | Canepa | G06F 12/0246 711/103 |
| 2015/0046636 A1* | 2/2015 | Seo | G06F 12/08 711/103 |
| 2015/0052329 A1* | 2/2015 | Fujinami | G06F 12/1027 711/207 |
| 2015/0134909 A1* | 5/2015 | Yochai | G06F 3/0626 711/118 |
| 2016/0078054 A1* | 3/2016 | Klughart | G06F 13/385 710/313 |
| 2017/0024295 A1* | 1/2017 | Klughart | G06F 11/2069 |
| 2017/0060698 A1* | 3/2017 | Noe | G06F 11/1471 |
| 2017/0131947 A1* | 5/2017 | Hoang | G06F 11/00 |
| 2017/0131948 A1* | 5/2017 | Hoang | G06F 3/0653 |
| 2017/0269836 A1* | 9/2017 | Yeh | G06F 3/0679 |
| 2018/0011642 A1* | 1/2018 | Koseki | G06F 11/1076 |
| 2018/0321883 A1* | 11/2018 | Lin | G06F 3/0679 |
| 2019/0266079 A1* | 8/2019 | R | G06F 3/064 |
| 2020/0192816 A1* | 6/2020 | Byun | G06F 12/0873 |
| 2020/0327063 A1* | 10/2020 | Kang | G06F 12/0871 |
| 2020/0364157 A1* | 11/2020 | Byun | G06F 12/126 |

* cited by examiner

MEMORY CONTROLLER HAVING IMPROVED MAP DATA ACCESS PERFORMANCE AND METHOD OF OPERATING THE SAME

CROSS-REFERENCE TO RELATED APPLICATION

The present application claims priority under 35 U.S.C. § 119(a) to Korean patent application number 10-2019-0005361, filed on Jan. 15, 2019, the entire disclosure of which is incorporated herein by reference in its entirety.

BACKGROUND

Field of Invention

Various embodiments of the present disclosure generally relate to an electronic device, and more particularly, to a memory controller and a method of operating the memory controller.

Description of Related Art

A storage device stores data under the control of a host device, such as a computer or a smartphone. The storage device may include a memory device in which data is stored and a memory controller which controls the memory device. Such memory devices are classified into a volatile memory device and a nonvolatile memory device.

The volatile memory device is a memory device in which data is stored only when power is supplied and in which stored data is lost when the supply of power is interrupted. Examples of the volatile memory device include a static random access memory (SRAM) and a dynamic random access memory (DRAM).

The nonvolatile memory device is a memory device in which stored data is retained even when the supply of power is interrupted. Examples of the nonvolatile memory device include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to a memory controller which is capable of providing improved map data access performance and a method of operating the memory controller.

An embodiment of the present disclosure may provide for a memory controller for controlling a memory device, wherein logical addresses corresponding to physical addresses of the memory device are divided into a plurality of areas. The memory controller may include a map cache configured to store one or more of a plurality of map data sub-segments respectively corresponding to a plurality of sub-areas included in each of the plurality of areas and a map data manager configured to generate information about a map data sub-segment to be provided to a host, which is determined based on a read count for each of the plurality of sub-areas, and generate information about a map data segment to be deleted from the host, which is determined based on the read count and a memory of the host, among one or more map data segments stored in the host, wherein the one or more map data segments include map data segments corresponding to one or more of the plurality of areas.

An embodiment of the present disclosure may provide for a method of operating a memory controller, the memory controller controlling a memory device and including a map cache for storing one or more of a plurality of map data sub-segments, the method comprising: generating information about a map data sub-segment to be provided to a host based on a read count for the memory device, among the plurality of map data sub-segments and generating information about a map data segment to be deleted from the host, among one or more map data segments stored in the host, based on the read count for the memory device and a memory capacity of the host, wherein logical addresses corresponding to physical addresses of the memory device are divided into a plurality of areas, each including a plurality of sub-areas, wherein the one or more map data segments include map data segments corresponding to one or more of the plurality of areas, and wherein the plurality of map data sub-segments include map data sub-segments respectively corresponding to the plurality of sub-areas.

An embodiment of the present disclosure may provide for a computing system comprising: a memory device including a plurality of areas, a host including a host memory and a controller, the controller including: a map cache configured to store a plurality of map data corresponding to the plurality of areas and a map data manager configured to determine at least one first map data among the plurality of map data as map data to be stored in the host memory and determine at least one second map data among multiple map data stored in the host memory as map data to be deleted, based on a read count for each of the plurality of areas and a capacity of the host memory, wherein a size of the first map data is different from a size of the second map data.

DETAILED DESCRIPTION

Figure 1:
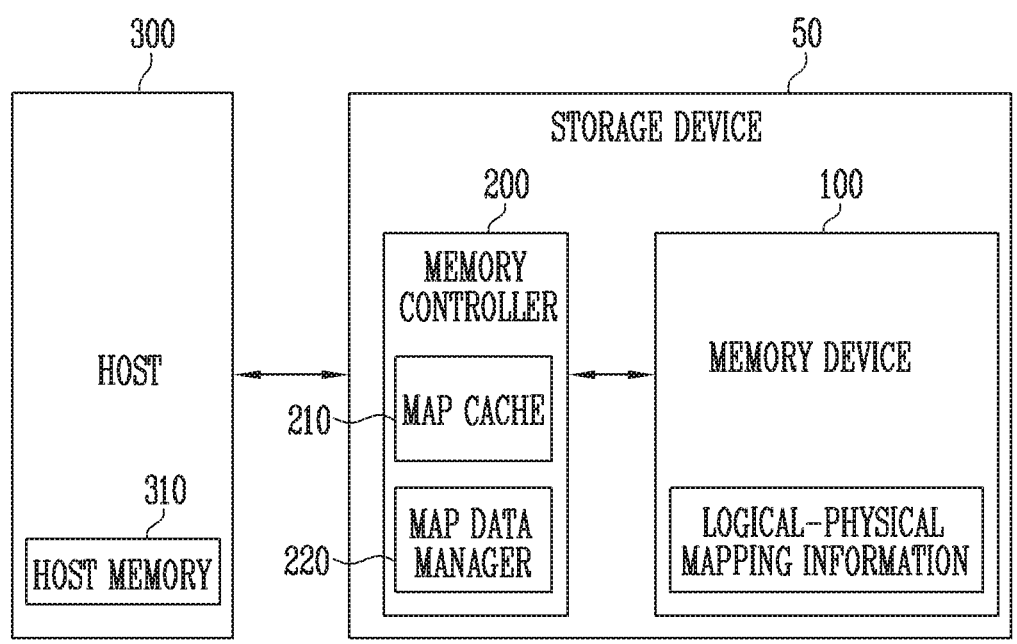
FIG. 1 is a diagram illustrating a storage device in accordance with an embodiment of the present disclosure.

Specific structural or functional descriptions in the embodiments of the present disclosure introduced in this specification or application are only for description of the embodiments of the present disclosure. The descriptions should not be construed as being limited to the embodiments described in the specification or application.

The present disclosure will now be described in detail based on the embodiments. The present disclosure may, however, be embodied in many different forms and should not be construed as being limited to only the embodiments set forth herein, but should be construed as covering modifications, equivalents or alternatives falling within ideas and technical scopes of the present disclosure. However, this is not intended to limit the present disclosure to particular modes of practice, and it is to be appreciated that all changes, equivalents, and substitutes that do not depart from the spirit and technical scope of the present disclosure are encompassed in the present disclosure.

It will be understood that, although the terms "first" and/or "second" may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Detailed description of functions and structures well known to those skilled in the art will be omitted to avoid obscuring the subject matter of the present disclosure. This aims to omit unnecessary description so as to make the subject matter of the present disclosure clear.

Various embodiments of the present disclosure will now be described more fully hereinafter with reference to the accompanying drawings, in which preferred embodiments of the present disclosure are illustrated, so that those of ordinary skill in the art can easily carry out the technical idea of the present disclosure.

FIG. 1 is a diagram illustrating a storage device 50 in accordance with an embodiment of the present disclosure.

Referring to FIG. 1, the storage device 50 may include a memory device 100 and a memory controller 200. The storage device 50 may be a device which stores data under the control of a host 300, such as a mobile phone, a smartphone, an MP3 player, a laptop computer, a desktop computer, a game console, a television (TV), a tablet personal computer (PC), or an in-vehicle infotainment system.

The storage device 50 may be manufactured as any one of various types of storage devices depending on a host interface that is a scheme for communication with the host 300. The storage device 50 may be implemented as any one of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 is operated in response to the control of the memory controller 200. The memory device 100 may include a memory cell array including a plurality of memory cells which store data.

Each of the memory cells may be implemented as a single-level cell (SLC) capable of storing a single bit of data, a multi-level cell (MLC) capable of storing two bits of data, a triple-level cell (TLC) capable of storing three bits of data, or a quad-level cell (QLC) capable of storing four bits of data.

The memory cell array may include a plurality of memory blocks. Each memory block may include a plurality of memory cells. A single memory block may include a plurality of pages. In an embodiment, each page may be a unit by which data is stored in the memory device 100 or by which data stored in the memory device 100 is read. A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In the present specification, a description will be made for the memory device 100 being a NAND flash memory.

The memory device 100 may receive a command and an address from the memory controller 200, and may access the area of the memory cell array, selected by the address. That is, the memory device 100 may perform an operation corresponding to the command on the area selected by the address. For example, the memory device 100 may perform a write operation (i.e., program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

In an embodiment, the memory device 100 may store logical-to-physical (L2P) mapping information. The logical-to-physical mapping information may be information indicating mapping relationships between logical addresses of data provided by the host 300 and physical addresses of the memory device 100 in which the data is stored.

In an embodiment, the logical-to-physical mapping information may be stored in respective spare areas of the plurality of memory blocks in the memory cell array. In an embodiment, the logical-to-physical mapping information may be stored in at least one system block which stores system information, among the plurality of memory blocks in the memory cell array.

In an embodiment, the logical addresses corresponding to the physical addresses of the memory device 100 may be divided into a plurality of areas. Each of the plurality of areas may include a plurality of sub-areas. A map data segment corresponding to each area may include a plurality of map data sub-segments respectively corresponding to a plurality of sub-areas in the corresponding area. Each of the map data sub-segments may include logical-to-physical mapping information corresponding to a logical address allocated to the corresponding sub-area.

The memory controller 200 controls the overall operation of the storage device 50.

When power is applied to the storage device 50, the memory controller 200 may run firmware (FW). When the memory device 100 is a flash memory device, the memory controller 200 may run firmware such as a flash translation layer (FTL) for controlling communication between the host 300 and the memory device 100.

In an embodiment, the memory controller 200 may receive data and a logical block address (LBA) from the host 300. Further, the memory controller 200 may translate the logical block address (LBA) into a physical block address (PBA) indicating the address of memory cells which are included in the memory device 100 and in which data is to be stored.

The memory controller 200 may control the memory device 100 so that a program operation, a read operation, or an erase operation is performed in response to a request received from the host 300. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may autonomously generate a program command, an address, and data regardless of a request from the host 300, and may transmit the generated information to the memory device 100. For example, the memory controller 200 may provide commands, addresses, and data to the memory device 100 which perform background operations, such as an operation for wear leveling and an operation for garbage collection.

In an embodiment, the memory controller 200 may control at least two memory devices 100. In this case, the memory controller 200 may control the memory devices 100 depending on an interleaving scheme to improve operating performance. The interleaving scheme may be an operating manner in which the operating periods of at least two memory devices 100 are caused to overlap each other.

In an embodiment, the memory controller 200 may include a map cache 210 and a map data manager 220.

The map cache 210 may store part of map data stored in the corresponding memory device 100. In detail, the map cache 210 may store one or more of a plurality of map data sub-segments stored in the memory device 100.

The map data in the map cache 210 may be utilized when data in the memory device 100 is accessed. When the map cache 210 is configured as a volatile memory operating at high speed, map data access performance may be improved, compared to an access of map data in the memory device 100 configured as a low-speed nonvolatile memory.

However, since the capacity of the map cache 210 is limited, map data access performance may be improved if the map data is stored in a host memory 310, and the map data stored in the host memory 310 is utilized when the data stored in the memory device 100 is accessed. In this way, a scheme for utilizing the host memory 310 on the side of the host 300 is referred to as a "Host-aware Performance Booster (HPB)".

The map data manager 220 may provide the map data to the host 300. An operation of storing the map data in the host memory 310 of the host 300 may be an activation operation. An operation of deleting the map data in the host memory 310 may be an inactivation operation. Based on a map data management policy of an HPB, the size of a unit of map data for an activation operation may be different from the size of a unit of map data for an inactivation operation.

In detail, the map data manager 220 may select a map data sub-segment to be provided to the host 300 and a map data segment to be deleted from the host 300. The map data manager 220 may generate information about the map data sub-segment to be provided to the host 300 and information about the map data segment to be deleted from the host 300. Further, the map data manager 220 may provide the generated information to the host 300.

In an embodiment, the map data manager 220 may decide a map data sub-segment to be removed from the map cache 210 as a map data sub-segment to be provided to the host 300. The map data sub-segment to be removed, may be determined according to a map cache management policy.

For example, the map data manager 220 may select the map data sub-segment to be provided to the host 300 based on a read count for the memory device 100. That is, the map data manager 220 may set the ranks of map data sub-segments in the map cache 210 based on read counts of respective map data sub-segments. Further, the map data manager 220 may determine a map data sub-segment having the lowest rank as the map data sub-segment to be removed. In various embodiments, the map data manager 220 may set the ranks of map data sub-segments based on recent access frequencies of respective map data sub-segments in the map cache 210. Further, the map data manager 220 may determine a map data sub-segment having the lowest rank as the map data sub-segment to be removed.

In various embodiments, the map data manager 220 may select a map data sub-segment to be provided to the host 300 based on the read count for the memory device 100, among pieces of map data for all logical addresses corresponding to the physical addresses of the memory device 100. The read count may be the number of times that a read operation performed on data having a preset size is counted. The map data manager 220 may determine that a map data sub-segment, for which a read count is greater than or equal to the preset number of times, is the map data sub-segment to be provided to the host 300. Alternatively, the map data manager 220 may determine that a map data sub-segment having the highest read count, among the pieces of map data, as the map data sub-segment to be provided to the host 300.

The map data manager 220 may generate information about a map data segment to be deleted from the host 300 based on the read count for the memory device 100 and the storage space of the host memory 310. The map data manager 220 may determine whether to delete a map data segment from the host 300 depending on whether the storage space of the host memory 310 is sufficient.

When the storage space of the host memory 310 is sufficient, the map data manager 220 may determine not to delete a map data segment from the host 300. When the storage space of the host memory 310 is insufficient, the map data manager 220 may determine to delete a map data segment from the host 300.

When the map data sub-segment to be provided to the host 300 is stored in the host memory 310, the map data manager 220 may determine whether the number of map data segments stored in the host memory 310 is greater than a threshold value. The threshold value may be the maximum number of map data segments that can be stored in the host memory 310.

When the number of map data segments in the host memory 310 is greater than the threshold value, the map data manager 220 may determine that the storage space of the host memory 310 is insufficient. When the number of map data segments in the host memory 310 is less than or equal to the threshold value, the map data manager 220 may determine that the storage space of the host memory 310 is sufficient.

When the storage space of the host memory 310 is insufficient, the map data manager 220 may provide host map update information to the host 300 so that a map data replacement operation is performed. The map data replacement operation may be an operation for storing a map data sub-segment to be provided to the host 300 in the host memory 310 and deleting a map data segment stored in the host memory 310 from the host 300.

In various embodiments, even if the storage space of the host memory 310 is insufficient, the map data manager 220 may not provide host map update information to the host 300 so that a map data replacement operation is not performed.

That is, when a read count of the map data segment to be deleted from the host 300 is greater than a read count of the map data sub-segment to be provided to the host 300, the map data manager 220 may not provide host map update information to the host 300 so that the map data replacement operation is not performed. The reason for this is that, when the read count of the map data segment to be deleted from the host 300 is greater than the read count of the map data sub-segment to be provided to the host 300, it is preferable that a replacement operation should not be performed from the standpoint of map data access performance.

That is, even if the read count of the map data segment to be deleted from the host 300 is less than that of the map data sub-segment to be provided to the host 300, the map data manager 220 may not provide host map update information to the host 300 so that the map data replacement operation is not performed. In detail, when the number of normal map data sub-segments in the map data segment to be deleted from the host 300 is greater than or equal to a preset number, the map data manager 220 may not provide the host map update information to the host 300. The reason for this is that, when cost and time, required in order to perform an operation of providing the normal map data sub-segments in the map data segment to the host 300 and storing the normal map data sub-segments therein, are taken into consideration, it is preferable that the map data segment should not be deleted from the standpoint of map data access performance.

The map data manager 220 may provide the host 300 with host map update information including both information about the map data sub-segment to be provided to the host 300 and information about the map data segment to be deleted from the host 300. Based on the host map update information, a map data replacement operation of storing the map data sub-segment to be provided to the host 300 in the host memory 310, and deleting the map data segment stored in the host memory 310 from the host 300 may be performed.

When a read request or a write request is received from the host 300, the map data manager 220 may provide a response including the host map update information to the host 300.

The map data manager 220 may provide the host 300 with the map data sub-segment to be provided to the host 300 in response to a map data request received from the host 300.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

In an embodiment, the host 300 may include the host memory 310. The host memory 310 may include a map data storage space for storing the map data provided from the memory controller 200. Since the capacity of the map cache 210 is limited, a scheme for accessing data using the map data stored in the host memory 310 may be an HPB scheme.

In detail, the memory controller 200 may provide map data to the host 300. The host 300 may store the provided map data in the host memory 310. The host 300 may utilize the map data stored in the host memory 310 when the data in the memory device 100 is read. The host 300 may provide map data including the physical address of the memory device 100 in which data to be read is stored, together with a read request, to the memory controller 200.

The memory controller 200 does not need to access map data stored in a separate memory device 100 or map data stored in the map cache 210. Further, the memory controller 200 may read the data to be read with reference to the map data provided from the host 300. Therefore, a data access operation is performed based on the map data stored in the host memory 310 other than the map cache 210, and thus constraints on the map cache 210 having a limited capacity may be solved. That is, the host memory 310 may be utilized as an extended area in which map data is stored in order to overcome constraints on the limited capacity of the map cache 210.

The host memory 310 may store data provided from the memory controller 200. The map data stored in the host memory 310 may be deleted. The size of a unit of map data provided to the host 300 may be different from the size of a unit of map data deleted from the host memory 310 according to the map data management policy of an HPB. For example, logical addresses corresponding to physical addresses of the memory device 100 may be divided into a plurality of areas. Each of the plurality of areas may include a plurality of sub-areas. Map data corresponding to each area may be a map data segment. Map data corresponding to each sub-area may be a map data sub-segment. Each map data segment may include a plurality of map data sub-segments.

In an embodiment, the host memory 310 may store a map data segment corresponding to at least one area. The unit of map data provided to the host 300 may be a map data sub-segment. The host memory 310 may store a preset number of map data segments. The preset number of map data segments may be the maximum number of map data segments that can be stored in the host memory 310.

An operation in a map data sub-segment, to be provided to the host 300, which is stored in the host memory 310, may be an activation operation. The map data on which the activation operation is to be performed may be determined based on a read count for the memory device 100. In detail, the map data on which the activation operation is to be performed may be determined based on the read count of the map data.

The unit of map data deleted from the host memory 310 may be a map data segment. An operation in which the map data segment in the host memory 310 is deleted may be an inactivation operation. Whether the inactivation operation is to be performed may be determined depending on whether the map data storage space of the host memory 310 is sufficient. When the map data storage space of the host memory 310 is sufficient, the inactivation operation may not be performed. When the map data storage space of the host memory 310 is insufficient, the inactivation operation may be performed.

That is, when a map data segment corresponding to a map data sub-segment on which an activation operation is to be performed is stored in the host memory 310, if the number of map data segments in the host memory 310 is greater than a threshold value, it may be determined that the map data storage space of the host memory 310 is insufficient. The threshold value may be the maximum number of map data segments that can be stored in the host memory 310. In this case, the inactivation operation of deleting an existing map data segment stored in the host memory 310 may be performed.

In an embodiment, map data on which the activation operation is to be performed may be map data to be removed from the map cache 210 according to the map cache management policy. The map data to be removed from the map cache 210 may be determined according to the map cache management policy based on the read count of the map data. For example, the map data to be removed from the map cache 210 may be map data having the lowest read count, among pieces of map data stored in the map cache 210. Alternatively, the map data to be removed from the map cache 210 may be map data having the least recent access frequency, that is, the least recently accessed map data, among the pieces of map data stored in the map cache 210.

In other embodiments, the map data on which an activation operation is to be performed may be map data for which a read count is greater than or equal to the preset number of times, among pieces of map data for all logical addresses corresponding to the physical addresses of the memory device 100. The map data on which the activation operation is to be performed may be map data having the highest read count, among pieces of map data for which read counts are greater than or equal to the preset number of times. Here, such a read count may be the number of times that a read operation performed on data having a preset size is counted.

In an embodiment, map data on which an inactivation operation is to be performed may be the least recently accessed map data, among pieces of map data stored in the host memory 310. The frequency with which map data is accessed may be determined based on the read count of data stored at a physical address included in the map data.

In various embodiments, an inactivation operation may not be performed even on the least recently accessed map data, among pieces of map data stored in the host memory 310. In detail, whether an inactivation operation is to be performed may be determined, depending on the number of pieces of map data corresponding to units of normal map data sub-segments included in a map data segment on which an inactivation operation is scheduled to be performed. When the number of normal map data sub-segments in the map data segment is greater than or equal to a preset number, an inactivation operation on the map data segment may not be performed.

In accordance with an embodiment of the present disclosure, an activation operation and an inactivation operation may be performed in consideration of the fact that the unit of map data for the activation operation is different from the unit of map data for the inactivation operation. The activation operation and the inactivation operation may be independently performed. In an embodiment, the activation operation and the inactivation operation may be performed together. In accordance with an embodiment of the present disclosure, a replacement operation between map data on which an activation operation is to be performed and map data on which an inactivation operation is to be performed may be efficiently performed.

Figure 2:
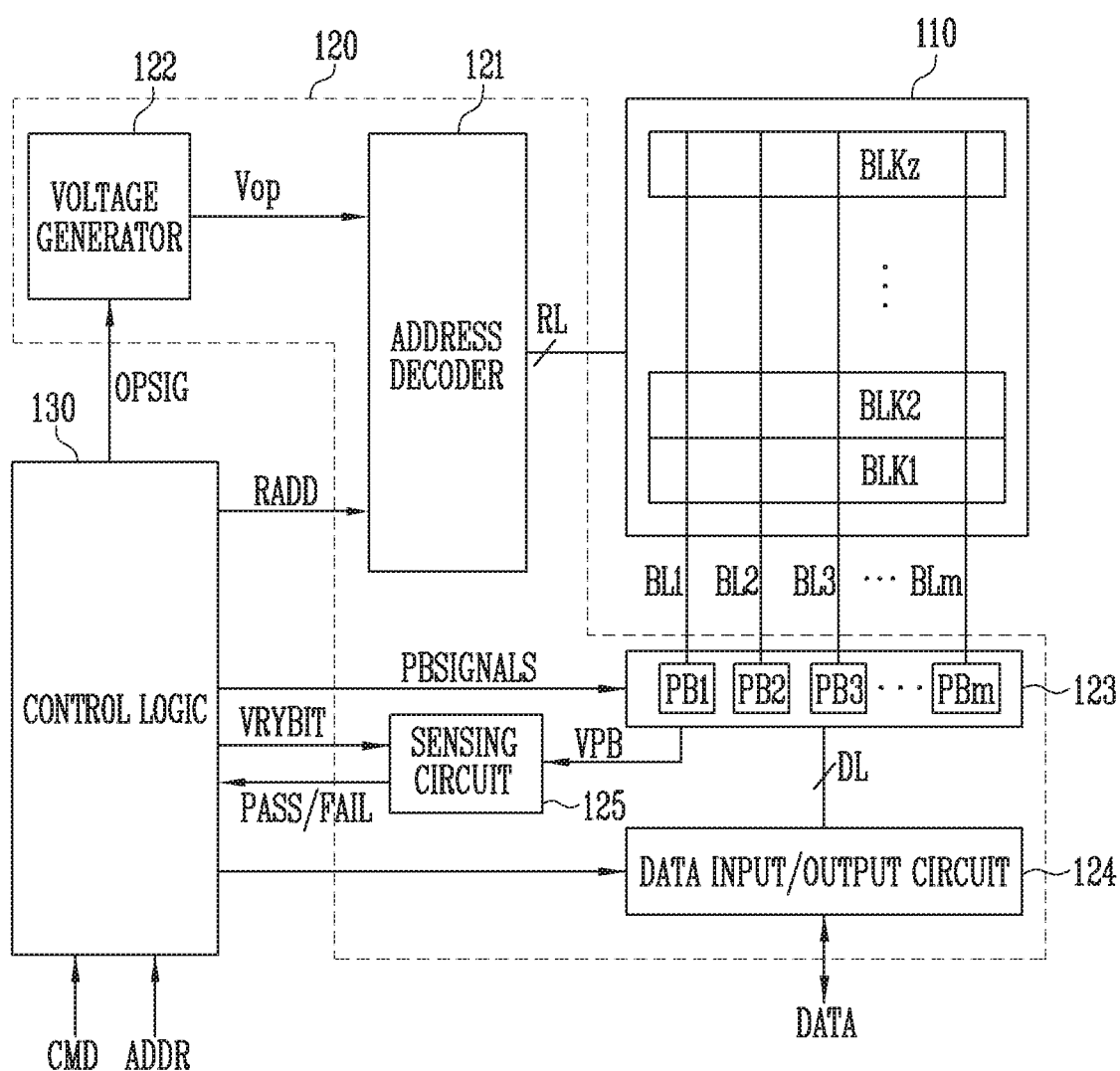
FIG. 2 is a diagram illustrating a memory device of FIG. 1.

FIG. 2 is a diagram illustrating the memory device of FIG. 1.

Referring to FIG. 2, the memory device 100 may include a memory cell array 110, a peripheral circuit 120, and a control logic 130. The peripheral circuit 120 may include an address decoder 121, a voltage generator 122, a read and write circuit 123, a data input and output (input/output) circuit 124, and a sensing circuit 125.

The memory cell array 110 includes a plurality of memory blocks BLK1 to BLKz. The plurality of memory blocks BLK1 to BLKz are coupled to the address decoder 121 through row lines RL. The memory blocks BLK1 to BLKz are coupled to the read and write circuit 123 through bit lines BL1 to BLm. Each of the memory blocks BLK1 to BLKz includes a plurality of memory cells. In an embodiment, the plurality of memory cells are nonvolatile memory cells. Among the plurality of memory cells, memory cells coupled to the same word line are defined as a single physical page. That is, the memory cell array 110 is composed of a plurality of physical pages. In accordance with an embodiment of the present disclosure, each of the plurality of memory blocks BLK1 to BLKz in the memory cell array 110 may include a plurality of dummy cells. One or more dummy cells may be coupled in series between a drain select transistor and the memory cells, and between a source select transistor and the memory cells.

Each of the memory cells of the memory device 100 may be implemented as a single-level cell (SLC) capable of storing a single bit of data, a multi-level cell (MLC) capable of storing two bits of data, a triple-level cell (TLC) capable of storing three bits of data, or a quad-level cell (QLC) capable of storing four bits of data.

The peripheral circuit 120 may drive the memory cell array 110. For example, the peripheral circuit 120 may drive the memory cell array 110 so that a program operation, a read operation, and an erase operation are performed.

The address decoder 121 is coupled to the memory cell array 110 through row lines RL. The row lines RL may include drain select lines, word lines, source select lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may be operated under the control of the control logic 130. The address decoder 121 receives addresses ADDR from the control logic 130.

The address decoder 121 may decode a block address among the received addresses ADDR. The address decoder 121 selects at least one memory block from among the memory blocks BLK1 to BLKz in response to the decoded block address. The address decoder 121 is configured to decode a row address RADD among the received addresses ADDR. The address decoder 121 may select at least one word line of the selected memory block by applying voltages supplied from the voltage generator 122 to at least one word line WL in response to the decoded row address RADD.

During a program operation, the address decoder 121 may apply a program voltage to the selected word line and apply a pass voltage having a level less than that of the program voltage to unselected word lines. During a program verify operation, the address decoder 121 may apply a verify voltage to a selected word line and apply a verify pass voltage having a level greater than that of the verify voltage to unselected word lines.

During a read operation, the address decoder 121 may apply a read voltage to a selected word line and apply a read pass voltage having a level greater than that of the read voltage to unselected word lines.

In accordance with an embodiment of the present disclosure, the erase operation of the memory device 100 may be performed on a memory block basis. During an erase operation, the addresses ADDR input to the memory device 100 include a block address. The address decoder 121 may decode the block address and select a single memory block in response to the decoded block address. During the erase operation, the address decoder 121 may apply a ground voltage to word lines coupled to the selected memory block.

In accordance with an embodiment of the present disclosure, the address decoder 121 may decode a column address among the received addresses ADDR. The decoded column address may be transferred to the read and write circuit 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage to generate a plurality of operating voltages Vop having various voltage levels. The voltage generator 122 may generate the plurality of operating voltages Vop by selectively enabling the plurality of pumping capacitors under the control of the control logic 130.

The generated operating voltages Vop may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm may be operated under the control of the control logic 130.

The first to m-th page buffers PB1 to PBm may transmit and receive data DATA to and from the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program pulse is applied to a selected word line. The memory cells in the selected page are programmed based on the received data DATA. Memory cells coupled to a bit line to which a program permission voltage (e.g., a ground voltage) is applied may have increased threshold voltages. The threshold voltages of memory cells coupled to a bit line to which a program inhibit voltage (e.g., a supply voltage) is applied may be maintained. During a program verify operation, the first to m-th page buffers PB1 to PBm may read data stored in selected memory cells from the selected memory cells through the bit lines BL1 to BLm.

During a read operation, the read and write circuit 123 may read data DATA from the memory cells in the selected page through the bit lines BL, and may store the read data DATA in the first to m-th page buffers PB1 to PBm.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated in response to the control of the control logic 130.

The data input/output circuit 124 may include a plurality of input/output buffers (not illustrated) which receive input data DATA. During a program operation, the data input/output circuit 124 receives the data DATA to be stored from an external controller (e.g., the memory controller 200 of FIG. 1). During a read operation, the data input/output circuit 124 outputs the data DATA, received from the first to m-th page buffers PB1 to PBm of the read and write circuit 123, to the external controller.

During a read operation or a verify operation, the sensing circuit 125 may generate a reference current in response to an enable bit VRYBIT signal generated by the control logic 130. Further, the sensing circuit 125 may output a pass signal or a fail signal to the control logic 130 by comparing a sensing voltage VPB received from the read and write circuit 123 with a reference voltage generated by the reference current.

The control logic 130 may be coupled to the address decoder 121, the voltage generator 122, the read and write circuit 123, the data input/output circuit 124, and the sensing circuit 125. The control logic 130 may control the overall operation of the memory device 100. The control logic 130 may be operated in response to a command CMD received from the external device.

The control circuit 130 may control the peripheral circuit 120 by generating various types of signals in response to the command CMD and the addresses ADDR. For example, the control logic 130 may generate an operation signal OPSIG, a row address RADD, read and write circuit control signals PBSIGNALS, and an enable bit VRYBIT in response to the command CMD and the addresses ADDR. The control logic 130 may output the operation signal OPSIG to the voltage generator 122, output the row address RADD to the address decoder 121, output the read and write circuit control signals PBSIGNALS to the read and write circuit 123, and output the enable bit VRYBIT to the sensing circuit 125. In addition, the control logic 130 may determine whether a verify operation has passed or failed in response to the pass or fail signal PASS or FAIL output from the sensing circuit 125.

Figure 3:
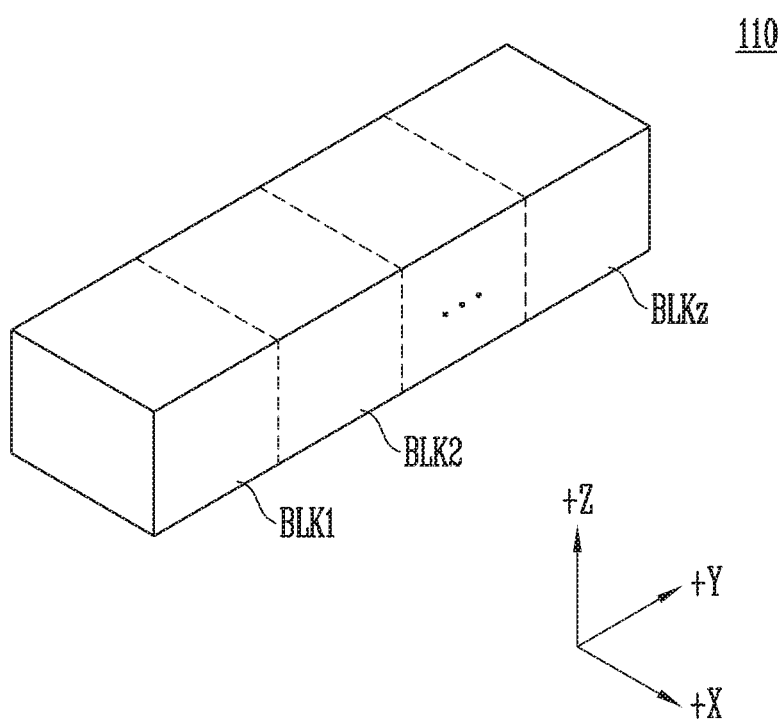
FIG. 3 is a diagram illustrating an example of a memory cell array of FIG. 2.

FIG. 3 is a diagram illustrating an example of the memory cell array 110 of FIG. 2.

Referring to FIG. 3, the memory cell array 110 includes a plurality of memory blocks BLK1 to BLKz. Each memory block may have a three-dimensional (3D) structure. Each memory block includes a plurality of memory cells stacked on a substrate. Such memory cells are arranged in a positive X (+X) direction, a positive Y (+Y) direction, and a positive Z (+Z) direction. The structure of each memory block will be described in detail below with reference to FIGS. 4 and 5.

Figure 4:
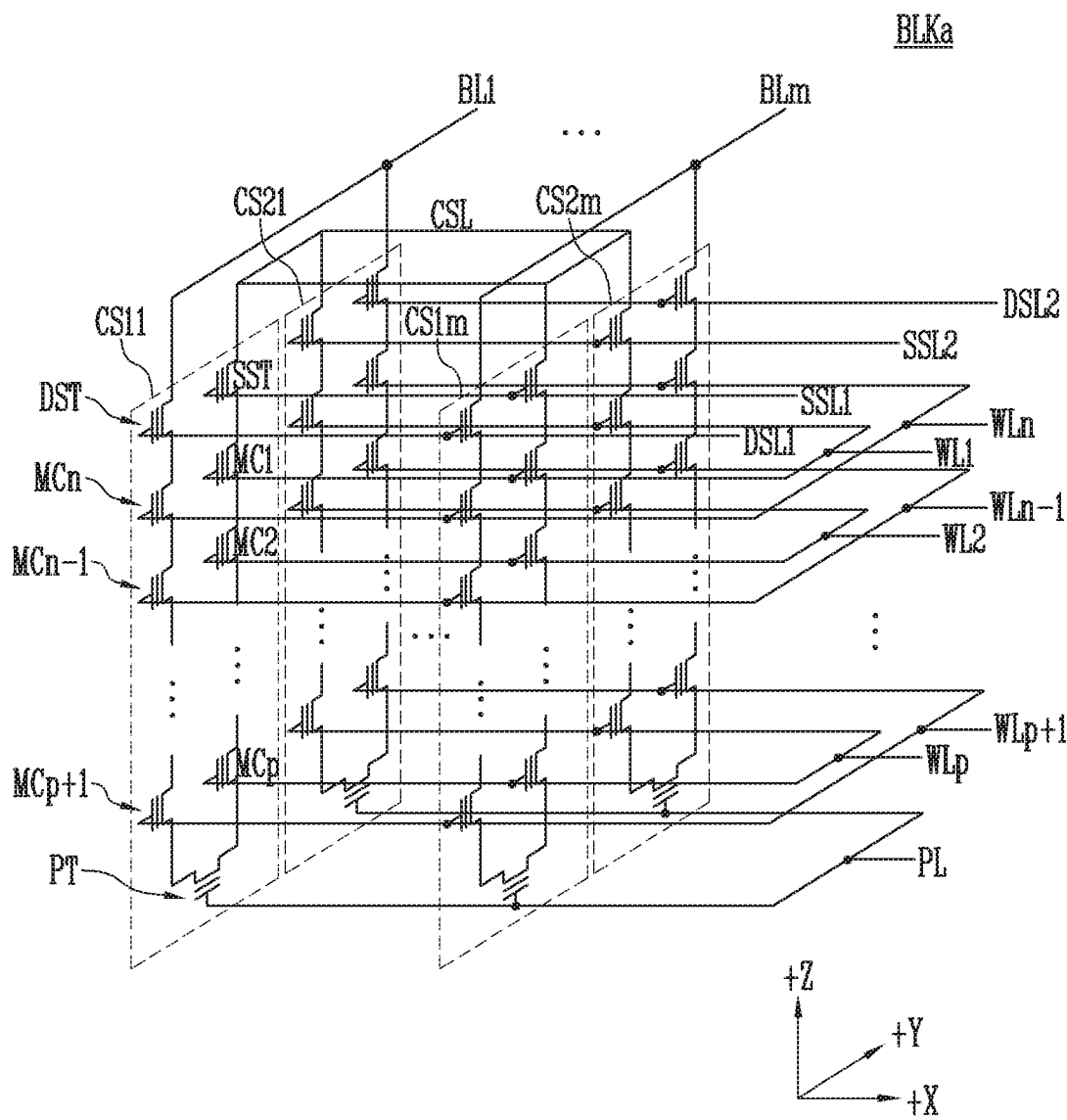
FIG. 4 is a circuit diagram illustrating a memory block of a plurality of memory blocks of FIG. 3.

FIG. 4 is a circuit diagram illustrating a memory block in accordance with an embodiment of the present disclosure, for example, a memory block BLKa of the memory blocks BLK1 to BLKz of FIG. 3.

Referring to FIG. 4, the memory block BLKa includes a plurality of cell strings CS11 to CS1m and CS21 to CS2m.

In an embodiment, each of the cell strings CS11 to CS1m and CS21 to CS2m may be formed in a 'U' shape. In the memory block BLKa, m cell strings are arranged in a row direction (i.e. a positive (+) X direction). Although FIG. 4 illustrates that two cell strings arranged in a column direction (i.e. a positive (+) Y direction), it will be understood that three or more cell strings may be arranged in the column direction.

Each of the plurality of cell strings CS11 to CS1m and CS21 to CS2m includes at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and memory cells MC1 to MCp.

In an embodiment, the source select transistors of cell strings arranged in the same row are coupled to a source select line extending in a row direction, and source select transistors of cell strings arranged in different rows are coupled to different source select lines. In FIG. 4, source select transistors of cell strings CS11 to CS1m in a first row are coupled to a first source select line SSL1. The source select transistors of cell strings CS21 to CS2m in a second row are coupled to a second source select line SSL2.

In an embodiment, source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in a direction opposite a positive (+) Z direction and are connected in series between the source select transistor SST and the pipe transistor PT. The (p+1)-th to n-th memory cells MCp+1 to MCn are sequentially arranged in the +Z direction and are connected in series between the pipe transistor PT and the drain select transistor DST. The first to p-th memory cells MC1 to MCp and the (p+1)-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is coupled between the corresponding bit line and the memory cells MCp+1 to MCn. The cell strings in a row direction are coupled to drain select lines extending in a row direction. Drain select transistors of cell strings CS11 to CS1m in the first row are coupled to a first drain select line DSL1. Drain select transistors of cell strings CS21 to CS2m in a second row are coupled to a second drain select line DSL2.

Cell strings arranged in a column direction are coupled to bit lines extending in a column direction. In FIG. 4, cell strings CS11 and CS21 in a first column are coupled to a first bit line BL1. Cell strings CS1m and CS2m in an m-th column are coupled to an m-th bit line BLm.

The memory cells coupled to the same word line in cell strings arranged in a row direction constitute a single page. For example, memory cells coupled to the first word line WL1, among the cell strings CS11 to CS1m in the first row, constitute a single page. Memory cells coupled to the first word line WL1, among the cell strings CS21 to CS2m in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even bit lines and odd bit lines, instead of first to m-th bit lines BL1 to BLm, may be provided. Further, even-numbered cell strings, among the cell strings CS11 to CS1m or CS21 to CS2m arranged in a row direction, may be coupled to the even bit lines, respectively, and odd-numbered cell strings, among the cell strings CS11 to CS1m or CS21 to CS2m arranged in the row direction, may be coupled to the odd bit lines, respectively.

In an embodiment, one or more of the first to n-th memory cells MC1 to MCn may be used as dummy memory cells. For example, one or more dummy memory cells are provided to reduce an electric field between the source select transistor SST and the memory cells MC1 to MCp. Alternatively, the one or more dummy memory cells are provided to reduce an electric field between the drain select transistor DST and the memory cells MCp+1 to MCn. As more dummy memory cells are provided, the reliability of the operation of the memory block BLKa is improved, but the size of the memory block BLKa is increased. As fewer memory cells are provided, the size of the memory block BLKa is reduced, but the reliability of the operation of the memory block BLKa may be deteriorated.

To efficiently control the one or more dummy memory cells, each of the dummy memory cells may have a required threshold voltage. Before or after the erase operation of the memory block BLKa is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 5:
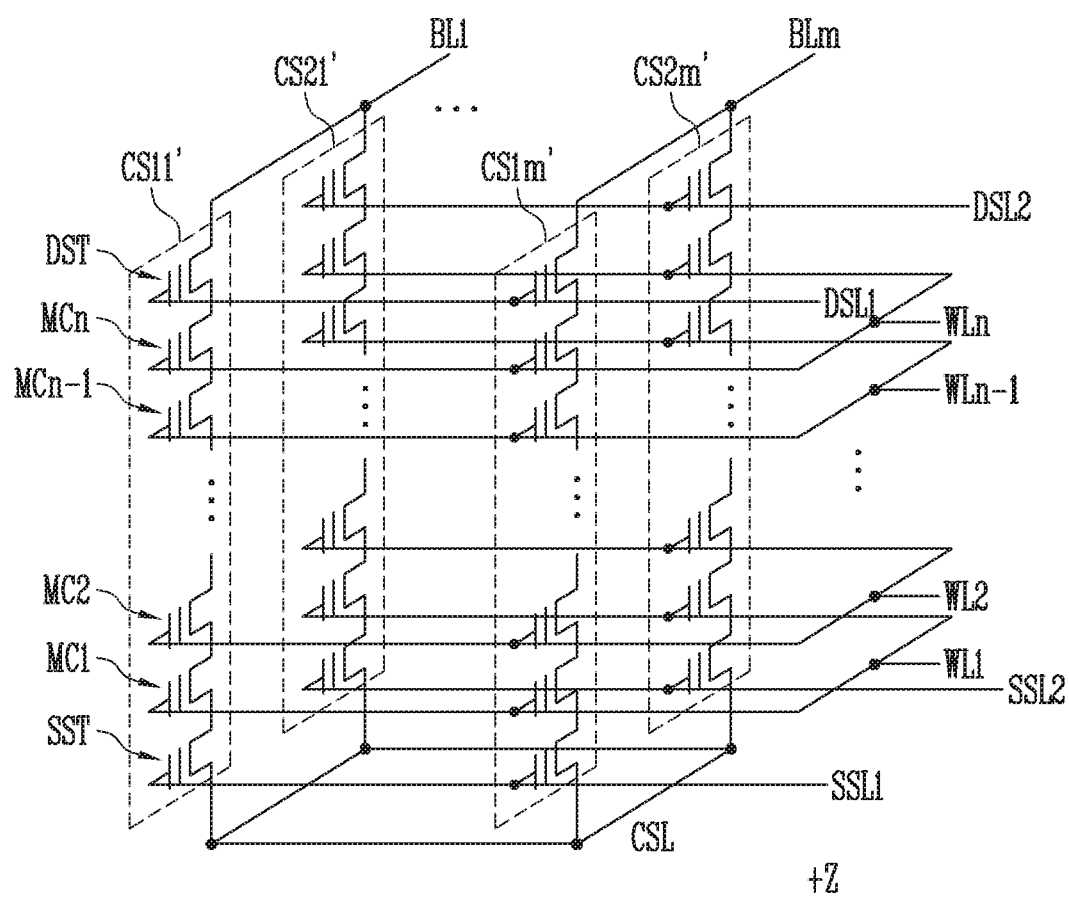
FIG. 5 is a circuit diagram illustrating a memory block of a plurality of memory blocks of FIG. 3.

FIG. 5 is a circuit diagram illustrating a memory block in accordance with an embodiment of the present disclosure, for example, a memory block BLKb of the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends in a positive Z (+Z) direction. Each of the cell strings CS11' to CS1m' and CS21' to CS2m' includes at least one source select transistor SST, first to n-th memory cells MC1 to MCn, and at least one drain select transistor DST, which are stacked on a substrate (not illustrated) below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1m' arranged in a first row are coupled to a first source select line SSL1. Source select transistors of cell strings CS21' to CS2m' arranged in a second row are coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extending in a row direction. The drain select transistors of the cell strings CS11' to CS1m' in the first row are coupled to a first drain select line DSL1. The drain select transistors of the cell strings CS21' to CS2m' in the second row are coupled to a second drain select line DSL2.

As a result, the memory block BLKb of FIG. 5 has an equivalent circuit similar to that of the memory block BLKa of FIG. 4 except that a pipe transistor PT is excluded from each cell string.

In an embodiment, even bit lines and odd bit lines, instead of first to m-th bit lines BL1 to BLm, may be provided. Further, even-numbered cell strings, among the cell strings CS11' to CS1m' or CS21' to CS2m' arranged in a row direction, may be coupled to the even bit lines, respectively, and odd-numbered cell strings, among the cell strings CS11' to CS1m' or CS21' to CS2m' arranged in the row direction, may be coupled to the odd bit lines, respectively.

In an embodiment, one or more of the first to n-th memory cells MC1 to MCn may be used as dummy memory cells. For example, the one or more dummy memory cells are provided to reduce an electric field between the source select transistor SST and the memory cells MC1 to MCn. Alternatively, the one or more dummy memory cells are provided to reduce an electric field between the drain select transistor DST and the memory cells MC1 to MCn. As more dummy memory cells are provided, the reliability of the operation of the memory block BLKb is improved, but the size of the memory block BLKb is increased. As fewer memory cells are provided, the size of the memory block BLKb is reduced, but the reliability of the operation of the memory block BLKb may be deteriorated.

To efficiently control the one or more dummy memory cells, each of the dummy memory cells may have a required threshold voltage. Before or after the erase operation of the memory block BLKb is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 6:
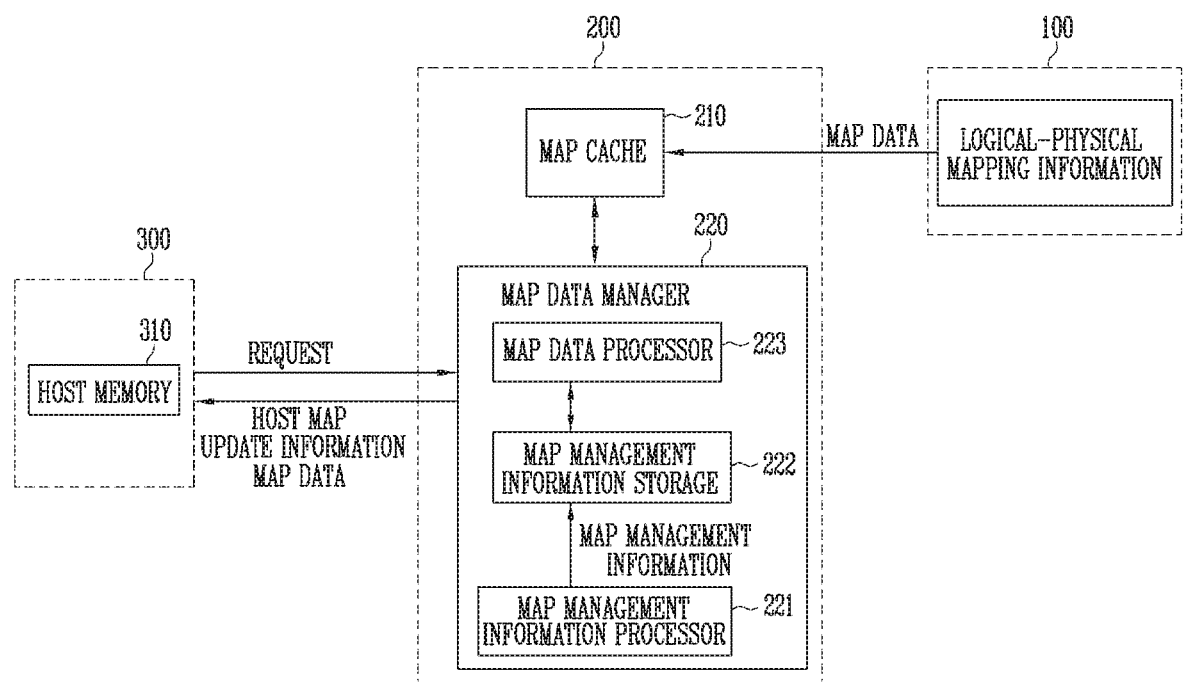
FIG. 6 is a diagram illustrating a memory controller in accordance with an embodiment.

FIG. 6 is a diagram illustrating a memory controller in accordance with an embodiment, for example, the memory controller 200 of FIG. 1.

Referring to FIG. 6, logical-to-physical (L2P) mapping information may be stored in a memory device 100. The L2P mapping information may be information indicating mapping relationships between the logical addresses of data provided by a host 300 and the physical addresses of the memory device 100 in which the data is stored.

In an embodiment, the logical addresses corresponding to the physical addresses of the memory device 100 may be divided into a plurality of areas. Each of the plurality of areas may include a plurality of sub-areas. A map data segment corresponding to each area may include a plurality of map data sub-segments respectively corresponding to the plurality of sub-areas included in the corresponding area. Each of the map data sub-segments may include logical-to-physical mapping information corresponding to a logical address allocated to the corresponding sub-area.

The memory controller 200 may include a map cache 210 and a map data manager 220.

The map cache 210 may store part of map data stored in the memory device 100. In detail, the map cache 210 may store one or more of a plurality of map data sub-segments indicating logical-physical mapping information in the memory device 100.

The map data in the map cache 210 may be utilized when the data in the memory device 100 is accessed. When the map cache 210 is configured as a volatile memory operating at high speed, map data access performance may be improved, compared to a case where map data stored in the memory device 100 configured as a low-speed nonvolatile memory is accessed.

However, since the capacity of the map cache 210 is limited, map data access performance may be improved if the map data is stored in a host memory 310 and the map data stored in the host memory 310 is utilized when the data stored in the memory device 100 is accessed. In this way, a scheme for utilizing the host memory 310 on the side of the host 300 is referred to as a "Host-aware Performance Booster (HPB)".

The map data manager 220 may include a map management information processor 221, a map management information storage 222, and a map data processor 223.

The map management information processor 221 may generate map management information based on a read count for the memory device 100. The map management information may include map cache management information, host map management information, and memory device map management information. The map cache management information may be information including read counts of map data sub-segments stored in the map cache 210. The host map management information may be information including read counts of map data segments stored in the host memory 310. The memory device map management information may be information including the read counts of a plurality of map data segments at all logical addresses corresponding to the physical addresses of the memory device 100. Each of the read counts in the memory device map management information may be the number of times that a read operation performed on data having a preset size is counted.

The map management information processor 221 may update the map management information in the map management information storage 222. When a read request is received from the host 300, the map management information processor 221 may update the corresponding read count in the map management information, which is stored in the map management information storage 222.

When map data in the host memory 310, the map cache 210 or the memory device 100 is added, deleted or changed, the map management information processor 221 may update map management information including the corresponding map data.

The map management information processor 221 may generate host map state information indicating whether map data sub-segments in the host memory 310 are normal map data sub-segments. The host map state information may be implemented as a bitmap.

For example, the map management information processor 221 may generate host map state information. The host map state information indicates a logical value of '1' when a stored map data sub-segment is a normal map data sub-segment. The host map state information indicates a logical value of '0' when the stored map data sub-segment is a dirty map data sub-segment or an empty map data sub-segment. The dirty map data sub-segment may be map data sub-segments having invalid map data information. In an embodiment, the map management information processor 221 may generate host map state information. The host map state information indicates a logical value of '0' when a stored map data sub-segment is a normal map data sub-segment. The host map state information indicates a logical value of '1' when the stored map data sub-segment is a dirty map data sub-segment or an empty map data sub-segment.

The map management information processor 221 may update the host map state information. For example, when an overwrite operation of storing new data for a logical address corresponding to a physical address included in a normal map data sub-segment is performed, the map management information processor 221 may change the normal map data sub-segment to a dirty map data sub-segment.

The map management information storage 222 may store the map cache management information, the host map management information, the memory device map management information, and/or the host map state information.

The map data processor 223 may provide the map data to the host 300. An operation of storing the map data in the host memory 310 in the host 300 may be an activation operation. An operation of deleting a map data in the host memory 310 may be an inactivation operation. Based on a map data management policy of an HPB, the size of a unit of map data for an activation operation may be different from the size of a unit of map data for an inactivation operation.

In detail, the map data processor 223 may select a map data sub-segment to be provided to the host 300 and a map data segment to be deleted from the host 300. The map data processor 223 may generate information about the map data sub-segment to be provided to the host 300 and information about the map data segment to be deleted from the host 300. Further, the map data processor 223 may provide the generated information to the host 300.

In an embodiment, the map data processor 223 may determine a map data sub-segment to be removed from the map cache 210 as the map data sub-segment to be provided to the host 300. The map data sub-segment to be removed from the map cache 210 may be determined according to a map cache management policy.

That is, the map data processor 223 may set the ranks of map data sub-segments based on read counts of respective map data sub-segments in the map cache 210 with reference to the map cache management information. Further, the map data processor 223 may determine that a map data sub-segment having the lowest rank as the map data sub-segment to be removed. In various embodiments, the map data processor 223 may set the ranks of map data sub-segments in the map cache 210 based on recent access frequencies of respective map data sub-segments. Further, the map data processor 223 may determine that a map data sub-segment having the lowest rank as the map data sub-segment to be removed.

In an embodiment, the map data processor 223 may select the map data sub-segment to be provided to the host 300, among pieces of map data for all logical addresses corresponding to the physical addresses of the memory device 100, with reference to the memory device map management information. Each read count may be the number of times that a read operation performed on data having a preset size is counted. The map data processor 223 may determine that a map data sub-segment, for which a read count is greater than or equal to the preset number of times, is the map data sub-segment to be provided to the host 300. Alternatively, the map data processor 223 may determine that a map data sub-segment having the highest read count, among pieces of map data, is the map data sub-segment to be provided to the host 300.

The map data processor 223 may generate information about the map data segment to be deleted from the host 300 based on the read count for the memory device 100 and the storage space of the host memory 310. The map data processor 223 may generate information about the map data segment to be deleted from the host 300 based on the host map management information.

The map data processor 223 may determine whether to delete the map data segment from the host 300 depending on whether the storage space of the host memory 310 is sufficient.

The map data processor 223 may determine not to delete the map data segment from the host 300 when the storage space of the host memory 310 is sufficient. The map data processor 223 may determine to delete the map data segment from the host 300 when the storage space of the host memory 310 is insufficient.

The map data processor 223 may determine whether the number of map data segments in the host memory 310 is greater than a threshold value when the map data sub-segment to be provided to the host 300 is stored in the host memory 310. The threshold value may be the maximum number of map data segments that can be stored in the host memory 310.

When the number of map data segments in the host memory 310 is greater than the threshold value, the map data processor 223 may determine that the storage space of the host memory 310 is insufficient. When the number of map data segments in the host memory 310 is less than or equal to the threshold value, the map data processor 223 may determine that the storage space of the host memory 310 is sufficient.

When the storage space of the host memory 310 is insufficient, the map data processor 223 may provide host map update information to the host 300 so that a map data replacement operation is performed. The map data replacement operation may be an operation in which the map data sub-segment to be provided to the host 300 is stored in the host memory 310 and in which a map data segment stored in the host memory 310 is deleted from the host 300.

In an embodiment, the map data processor 223 may determine whether to perform a map data replacement operation based on the host map management information, the host map state information, and the map cache management information. In an embodiment, the map data processor 223 may determine whether to perform a map data replacement operation based on the host map management information, the host map state information, and the memory device map management information.

In various embodiments, even if the storage space of the host memory 310 is insufficient, the map data processor 223 may not provide host map update information to the host 300 so that a map data replacement operation is not performed.

That is, when the read count of the map data segment to be deleted from the host 300 is greater than the read count of the map data sub-segment to be provided to the host 300, the map data processor 223 may not provide host map update information to the host 300 so that a map data replacement operation is not performed.

In various embodiments, even if the read count of the map data segment to be deleted from the host 300 is less than the read count of the map data sub-segment to be provided to the host 300, the map data processor 223 may not provide host map update information to the host 300 so that a map data replacement operation is not performed. In detail, the map data processor 223 may determine, based on the host map state information, the number of normal map data sub-segments in the map data segment to be deleted from the host 300. When the number of normal map data sub-segments in the map data segment to be deleted from the host 300 is greater than or equal to a preset number, the map data processor 223 may not provide host map update information to the host 300.

The map data processor 223 may provide the host 300 with host map update information including both information about the map data sub-segment to be provided to the host 300 and information about the map data segment to be deleted from the host 300. Based on the host map update information, a map data replacement operation may be performed. Through the map data replacement operation, the map data sub-segment to be provided to the host 300 is stored in the host memory 310 and the map data segment stored in the host memory 310 is deleted from the host 300.

When a read request or a write request is received from the host 300, the map data processor 223 may provide a response including the host map update information to the host 300.

The map data processor 223 may provide the host 300 with the map data sub-segment to be provided to the host 300 in response to a map data request received from the host 300.

In an embodiment, the host 300 may include the host memory 310. The host memory 310 may include a map data storage space for storing the map data provided from the memory controller 200. Since the capacity of the map cache 210 is limited, a scheme for accessing data using the map data in the host memory 310 may be an HPB scheme. The host memory 310 may be identical to the host memory, described above with reference to FIG. 1.

Figure 7:
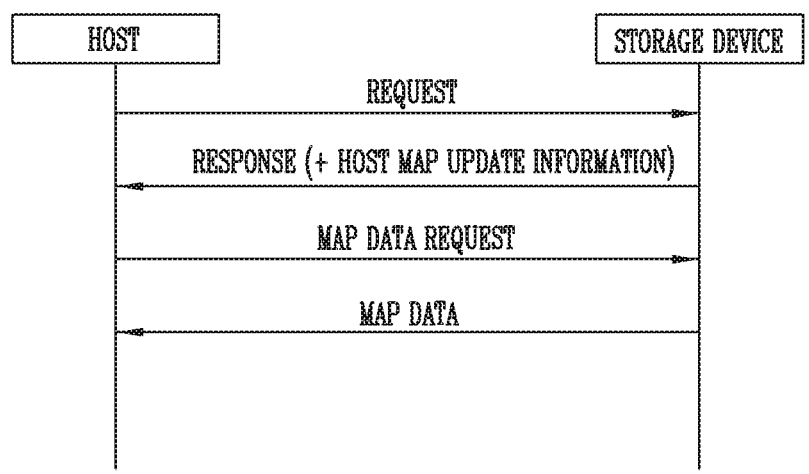
FIG. 7 is a diagram illustrating a process between a host and a storage device in accordance with an embodiment.

FIG. 7 is a diagram illustrating a process between a host and a storage device in accordance with an embodiment, for example, a process between the host 300 and the storage device 50 of FIGS. 1 and 6.

Referring to FIG. 7, the host may provide a command, indicating the operation of the storage device including a read request or a write request, to the storage device.

When the command is received from the host, the storage device may provide a response including host map update information to the host. In detail, some of the field areas constituting the response provided by the storage device to the host may be areas related to host map update information.

The host may provide a map data request to the storage device based on the host map update information. In response to the map data request received from the host, the storage device may provide map data corresponding to the map data request to the host.

Figure 8:
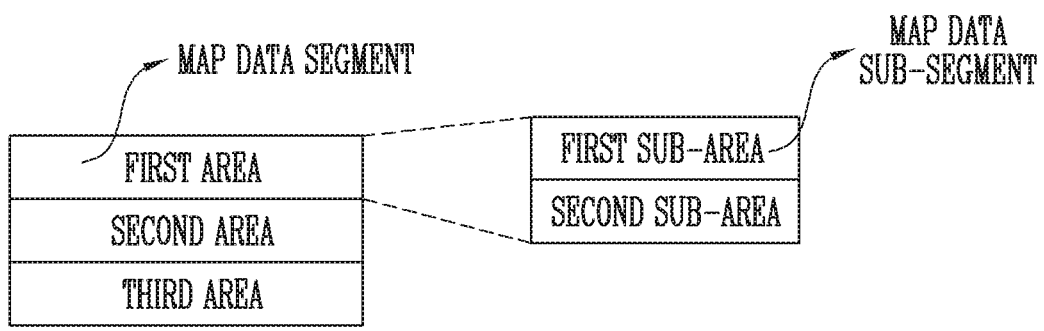
FIG. 8 is a diagram illustrating map data in accordance with an embodiment.

FIG. 8 is a diagram illustrating map data in accordance with an embodiment.

Referring to FIGS. 1 and 8, logical addresses provided by a host may correspond to physical addresses of a memory device. Logical addresses may be divided into a plurality of areas. Each of the plurality of areas may include a plurality of sub-areas. Map data corresponding to each area may be a map data segment. Map data corresponding to each sub-area may be a map data sub-segment.

In FIG. 8, the logical addresses corresponding to the physical address of the memory device may be divided into first to third areas. Each of the first to third areas may include first and second sub-areas. The number of areas into which the logical addresses corresponding to the physical addresses of the memory device are divided and the number of sub-areas in each area are not limited to the present embodiment.

Figure 9:
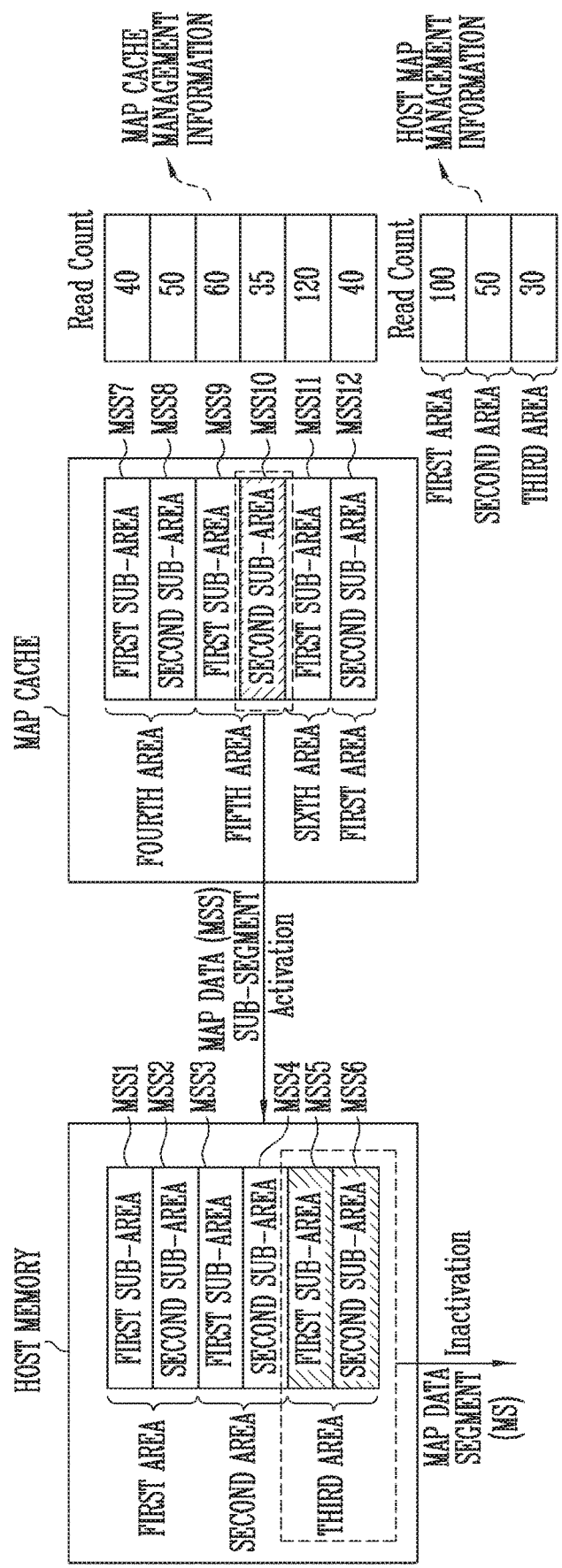
FIG. 9 is a diagram illustrating a map data management operation in accordance with an embodiment.

FIG. 9 is a diagram illustrating a map data management operation between a map cache and a host memory in accordance with an embodiment. For example, the map data management operation may be performed between the host memory 300 of the host 300 and the map cache 210 of the memory controller 200 in FIGS. 1 and 6.

Referring to FIG. 9, a map cache may store map data sub-segments corresponding to at least one of sub-areas in the first to sixth areas. Each of first to sixth areas may include first and second sub-areas. In FIG. 9, a map data sub-segment corresponding to the second sub-areas of the sixth area is not illustrated.

Map data stored in a host memory may be managed on a map data segment basis.

For example, the host memory may store first to third map data segments respectively corresponding to first to third areas. The first map data segment corresponding to the first area of the host memory may include a first map data sub-segment MSS1 corresponding to a first sub-area in the first area and a second map data sub-segment MSS2 corresponding to a second sub-area in the first area.

The second map data segment corresponding to the second area of the host memory may include a third map data sub-segment MSS3 corresponding to a first sub-area in the second area and a fourth map data sub-segment MSS4 corresponding to a second sub-area in the second area.

The third map data segment corresponding to the third area of the host memory may include a fifth map data sub-segment MSS5 corresponding to a first sub-area in the third area and a sixth map data sub-segment MSS6 corresponding to a second sub-area in the third area.

Map data stored in a map cache may be managed on a map data sub-segment basis. For example, the map cache may store a seventh map data sub-segment MSS7 corresponding to a first sub-area in the fourth area and an eighth map data sub-segment MSS8 corresponding to a second sub-area in the fourth area.

The map cache may store a ninth map data sub-segment MSS9 corresponding to a first sub-area in the fifth area and a tenth map data sub-segment MSS10 corresponding to a second sub-area in the fifth area.

The map cache may store an eleventh map data sub-segment MSS11 corresponding to a first sub-area in the sixth area and a twelfth map data sub-segment MSS12 corresponding to the second sub-area in the first area.

A map data sub-segment may be selected from among the map data sub-segments in the map cache. The selected map data sub-segment MSS may be provided to the host. An operation of storing a map data sub-segment in the host memory may be an activation operation. A map data segment MS selected from among the map data segments stored in the host memory may be deleted. An operation of deleting the map data segment in the host memory may be an inactivation operation.

In an embodiment, the map data sub-segment MSS2 corresponding to the second sub-area of the first area of the host memory may be an old one. The map data sub-segment MSS12 corresponding to the second sub-area of the first area of the map cache may be a new one. The twelfth map data sub-segment MSS12 in the map cache may be a normal map data sub-segment, which will be described later with reference to FIG. 11. The second map data sub-segment MSS2 in the host memory may be a dirty map data sub-segment.

When the normal map data sub-segment in the map cache is provided to the host, the dirty map data sub-segment in the host memory may be replaced with the corresponding normal map data sub-segment. Therefore, the second map data sub-segment MSS2 which is the dirty map data sub-segment, may be replaced with the twelfth map data sub-segment MSS12 which is the normal map data sub-segment.

The map cache information may be information including read counts of respective map data sub-segments in the map cache. For example, the read counts of the seventh map data sub-segment MSS7 to twelfth map data sub-segment MSS12 may be 40, 50, 60, 35, 120, and 40, respectively.

The host map management information may be information including the read counts of respective map data segments in the host memory. Respective read counts of the first to third map data segments may be 100, 50, and 30.

In an embodiment, a map data sub-segment to be removed from the map cache may be determined as a map data sub-segment to be provided to the host according to a map cache management policy. In detail, the map data sub-segment to be removed from the map cache may be the map data sub-segment having the lowest read count, among map data sub-segments stored in the map cache. Therefore, the tenth map data sub-segment having a lowest count of 35 may be determined as the map data sub-segment to be provided to the host.

In various embodiments, the map cache management policy may include a least frequently used (LFU) or a least recently used (LRU) policy. In accordance with the LFU policy, the least frequently used map data sub-segment may be determined as the map data sub-segment to be removed from the map cache. That is, the earliest used map data sub-segment may be determined to be the map data sub-segment to be removed from the map cache.

In accordance with the LRU policy, the least recently used map data sub-segment may be determined to be the map data sub-segment to be removed from the map cache. That is, the least recently used map data sub-segment may be determined to be the map data sub-segment to be removed.

When a map data sub-segment is provided to the host, it may be determined whether the map data storage space of the host memory is sufficient.

When the map data storage space of the host memory is sufficient, an operation of deleting a map data segment in the host memory may not be performed. When the map data storage space of the host memory is insufficient, an operation of deleting a map data segment in the host memory may be performed.

In an embodiment, when the map data segment corresponding to a map data sub-segment to be provided to the host has been stored in the host memory, it may be determined that the map data storage space is sufficient.

In an embodiment, when a map data segment corresponding to a map data sub-segment to be provided to the host is not stored in the host memory, it may be determined that the map data storage space is sufficient depending on whether a new map data segment can be stored in the host memory.

The maximum number of map data segments that can be stored in the map data storage space of the host memory may be limited. The maximum number of map data segments may be a preset threshold value. That is, when the number of map data segments in the map data storage space is less than the threshold value, it may be determined that the map data storage space is sufficient. When the number of map data segments in the map data storage space is equal to the threshold value, it may be determined that the map data storage space is insufficient.

In FIG. 9, a map data segment corresponding to the tenth map data sub-segment MSS10 to be provided to the host may be the fifth map data segment corresponding to the fifth area. The fifth map data segment is not yet stored in the host memory.

Therefore, it may be determined that the map data storage space is sufficient depending on whether the fifth map data segment corresponding to the tenth map data sub-segment MSS10 may be stored in the host memory.

In FIG. 9, the maximum number of map data segments that can be stored in the map data storage space of the host memory may be 3. That is, the preset threshold value may be 3.

Since the first to third map data segments are already stored in the map data storage space of the host memory, the number of map data segments in the map data storage space may be 3, which is equal to the threshold value. Therefore, it may be determined that the map data storage space is insufficient.

Thus, an operation for determining n a map data segment having the lowest read count, among the first to third meta data segments in the map data storage space, as a map data segment to be deleted may be performed. The determined map data segment may be the third map data segment having the lowest read count, that is, 30.

In an embodiment, an operation of comparing the read count of the map data segment determined to be deleted from the host with the read count of the map data sub-segment determined to be provided to the host may be performed. When the read count of the map data segment decided to be deleted is greater than or equal to the read count of the map data sub-segment determined to be provided to the host, the operation of deleting the map data segment determined to be deleted may not be performed. When the read count of the map data segment determined to be deleted is less than the read count of the map data sub-segment determined to be provided to the host, the operation of deleting the map data segment determined to be deleted may be performed.

For example, the read count of the third map data segment, which is the map data segment determined to be deleted, may be 30. For example, the read count of the tenth map data sub-segment MSS10, which is the map data sub-segment determined to be provided, may be 35. Therefore, since the read count of the tenth map data sub-segment MSS10 is greater than the read count of the third map data segment, the operation of deleting the third map data segment from the host memory may be performed.

When the third map data segment is deleted from the host memory, the tenth map data sub-segment MSS10 may be provided to the host. When the tenth map data sub-segment MSS10 is provided to the host, the fifth map data segment corresponding to the fifth area may be stored in the host memory.

Here, the fifth map data segment in the host memory may include the tenth map data sub-segment MSS10 corresponding to the second sub-area in the fifth area. The fifth map data segment may include an empty map data sub-segment corresponding to the first sub-area in the fifth area. The empty map data sub-segment will be described later with reference to FIG. 11.

Figure 10:
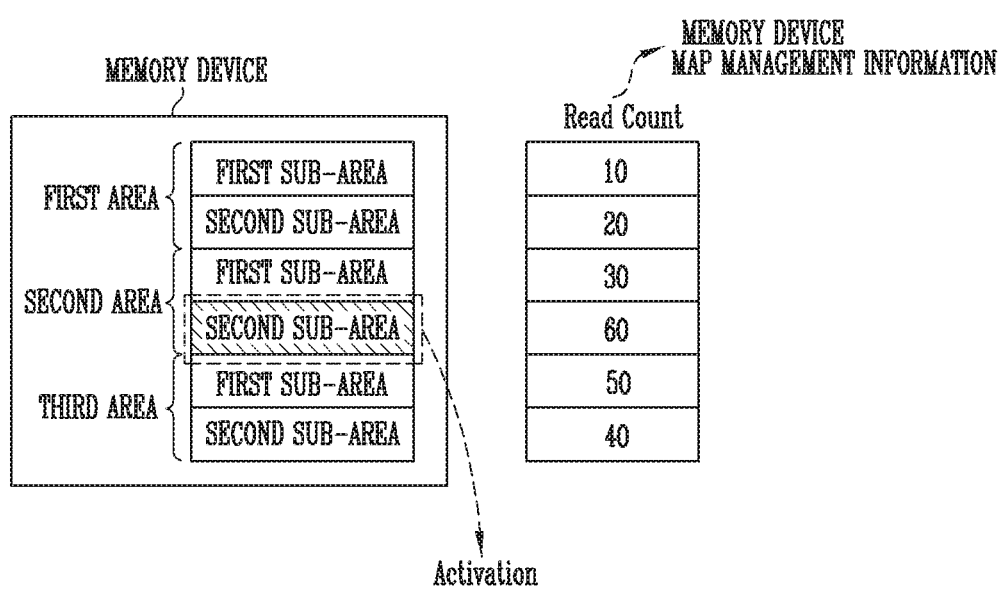
FIG. 10 is a diagram illustrating an operation of providing a map data sub-segment in accordance with an embodiment.

FIG. 10 is a diagram illustrating an operation of providing a map data sub-segment in accordance with an embodiment.

Referring to FIG. 10, a memory device may be divided into first to third areas. Each of the first to third areas may include first and second sub-areas. Thus, logical addresses corresponding to physical addresses of the memory device may be divided into the first to third areas.

A read count of a first map data sub-segment corresponding to the first sub-area in the first area may be 10. A read count of a second map data sub-segment corresponding to the second sub-area in the first area may be 20. A read count of a third map data sub-segment corresponding to the first sub-area in the second area may be 30. A read count of a fourth map data sub-segment corresponding to the second sub-area in the second area may be 60. A read count of a fifth map data sub-segment corresponding to the first sub-area in the third area may be 50. A read count of a sixth map data sub-segment corresponding to the second sub-area in the third area may be 40.

Memory device map management information may be information including respective read counts of a plurality of map data sub-segments in the entire memory device. In an embodiment, each read count may be the number of times that a read operation performed on data having a preset size, among pieces of data stored at physical addresses in the corresponding map data sub-segment, is counted.

A map data sub-segment to be provided to the host may be determined based on the memory device map management information.

In an embodiment, the map data sub-segment to be provided to the host may be a map data sub-segment having the read count greater than the preset number of times, among the plurality of map data sub-segments. In various embodiments, the map data sub-segment to be provided to the host may be a map data sub-segment having the highest read count, among the plurality of map data sub-segments.

For example, the fourth map data sub-segment having the highest read count, that is, a value of 60 may be determined to be the map data sub-segment to be provided to the host. The fourth map data sub-segment may be a map data sub-segment corresponding to the second sub-area in the second area.

Figure 11:
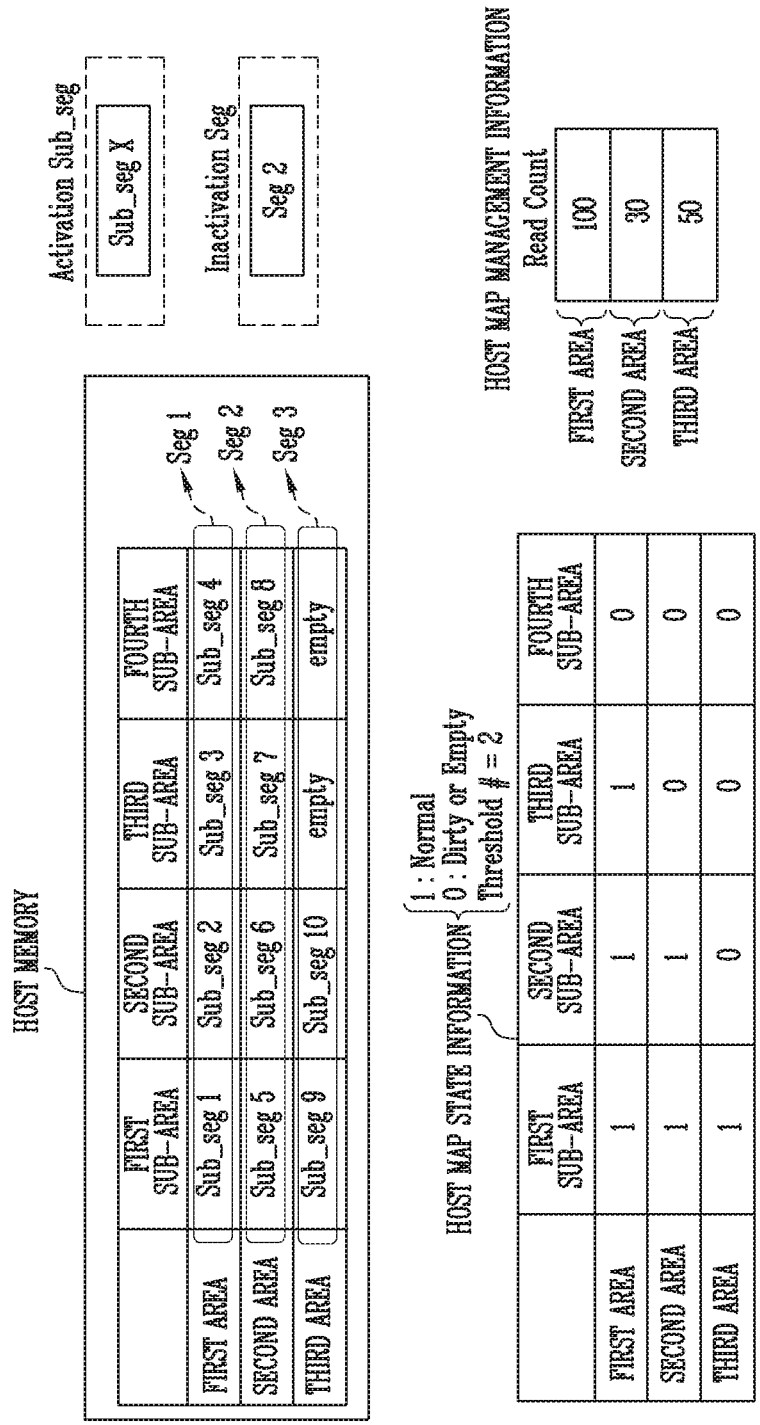
FIG. 11 is a diagram illustrating an operation of deleting a map data segment in accordance with an embodiment.

FIG. 11 is a diagram illustrating an operation of deleting a map data segment in accordance with an embodiment.

Referring to FIG. 11, each of first to third areas may include first to fourth sub-areas.

Map data sub-segments respectively corresponding to the first to fourth sub-areas in the first area may be first to fourth map data sub-segments Sub_seg 1 to Sub_seg 4.

Map data sub-segments respectively corresponding to the first to fourth sub-areas in the second area may be fifth to eighth map data sub-segments Sub_seg 5 to Sub_seg 8.

Map data sub-segments respectively corresponding to the first and second sub-areas in the third area may be ninth and tenth map data sub-segments Sub_seg 9 and Sub_seg 10. Map data sub-segments respectively corresponding to the third and fourth sub-areas in the third area may be empty map data sub segments. The empty map data sub-segments may be in a state in which map data sub-segments corresponding to the corresponding sub-areas are not stored.

The host memory may store first to third map data segments Seg 1 to Seg 3. The first map data segment Seg 1 may include the first to fourth map data sub-segments Sub_seg 1 to Sub_seg 4. The second map data segment Seg 2 may include the fifth to eighth map data sub-segments Sub_seg 5 to Sub_seg 8. The third map data segment Seg 3 may include the ninth and tenth map data sub-segments Sub_seg 9 and Sub_seg 10 and empty map data sub-segments.

The host map state information may be information indicating whether map data sub-segments corresponding to each of the map data segments are normal map data sub-segments.

That is, map data sub-segments other than the normal map data sub-segments may be dirty map data sub-segments or empty map data sub-segments. The normal map data sub-segments may be map data sub-segments having valid map data information. The dirty map data sub-segments may be map data sub-segments having invalid map data information. When an overwrite operation of storing new data for a logical address corresponding to a physical address in a normal map data sub-segment is performed, the normal map data sub-segment may be changed to a dirty map data sub-segment. An empty map data sub-segment may be a map data sub-segment corresponding to an empty sub-area in which map data is not stored.

In an embodiment, the host map state information may be implemented as a bitmap. A logical value of '1' may indicate a normal map data sub-segment. A logical value of '0' may indicate a dirty map data sub-segment or an empty map data sub-segment. In an embodiment, a logical value of '0' may indicate a normal map data sub-segment. A logical value of '1' may indicate a dirty map data sub-segment or an empty map data sub-segment.

For example, map data sub-segments corresponding to the first to third sub-areas in the first area may be normal map data sub-segments, based on the host map state information. The map data sub-segments corresponding to the first and second sub-areas in the second area may be normal map data sub-segments. A map data sub-segment corresponding to the first sub-area in the third area may be a normal map data sub-segment.

A map data sub-segment corresponding to the fourth sub-area in the first area may be a dirty map data sub-segment or an empty map data sub-segment. The map data sub-segments corresponding to the third and fourth sub-areas in the second area may be dirty map data sub-segments or empty map data sub-segments. The map data sub-segments corresponding to the second to fourth sub-areas in the third area may be dirty map data sub-segments or empty map data sub-segments.

In FIG. 11, a map data sub-segment to be activated in the host may be a map data sub-segment to be provided to the host. A read count of the map data sub-segment Sub_seg X to be provided to the host may be 40. The map data sub-segment Sub_seg X to be provided to the host may be a map data sub-segment that does not correspond to the first to third segments Seg 1 to Seg 3.

A map data segment to be inactivated in the host may be a map data segment to be deleted from the host.

The second map data segment Seg 2 having the lowest read count may be determined as the map data segment to be deleted from the host. The second map data segment Seg 2 having the lowest read count may be determined based on the host map management information.

When the number of normal map data sub-segments in a map data segment, which is stored in the host memory, is less than a preset number that is a threshold value, an operation of deleting the corresponding map data segment from the host memory may be performed. In contrast, when the number of normal map data sub-segments in a map data segment, which is stored in the host memory, is greater than or equal to the preset number that is the threshold value, the operation of deleting the corresponding map data segment from the host memory may not be performed.

For example, since the read count of the second map data segment Seg 2 to be deleted from the host is less than the read count of the map data sub-segment Sub_seg X to be provided to the host, an operation of deleting the second map data segment Seg 2 may be performed in principle.

In FIG. 11, the number of normal map data sub-segments in the second map data segment Seg 2 is greater than or equal to the preset number (that is, 2), the delete operation may not be performed.

Figure 12:
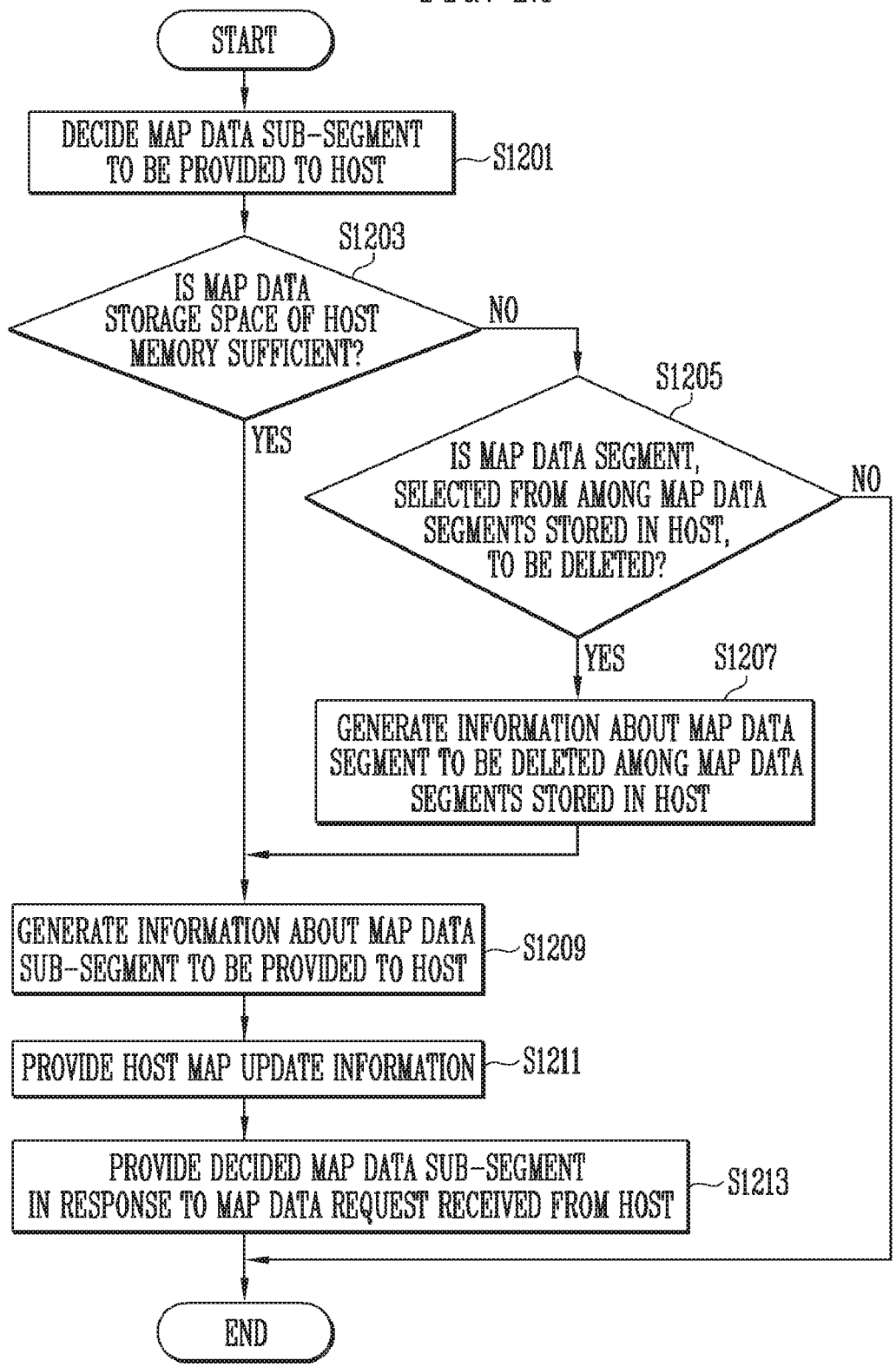
FIG. 12 is a flowchart illustrating an operation of a memory controller in accordance with an embodiment.

FIG. 12 is a flowchart illustrating an operation of a memory controller in accordance with an embodiment. For example, the operation of FIG. 12 may be performed by the memory controller 200 of FIGS. 1 and 6.

Referring to FIG. 12, at step S1201, the memory controller may decide a map data sub-segment to be provided to a host.

At step S1203, the memory controller may determine whether the map data storage space of a host memory is sufficient. When it is determined that the map data storage space is sufficient (S1203, YES), the memory controller may proceed to step S1209. When it is determined that the map data storage space is insufficient (S1203, NO), the memory controller may proceed to step S1205.

In detail, the memory controller may determine whether the map data storage space is sufficient, based on whether the number of map data segments in the map data storage space of the host memory is equal to a threshold value. When the number of map data segments in the map data storage space is less than the threshold value, the memory controller may determine that the map data storage space is sufficient. When the number of map data segments in the map data storage space is equal to the threshold value, the memory controller may determine that the map data storage space is insufficient. The threshold value may be the maximum number of map data segments that can be stored in the map data storage space.

At step S1205, the memory controller may determine whether to delete a map data segment selected from among the map data segments stored in the host. When it is determined to delete the selected map data segment (S1205, YES), the memory controller proceeds to step S1207. Otherwise, the memory controller terminates the process.

In detail, the memory controller may determine whether to delete the selected map data segment based on the result of a comparison between a read count of the selected map data segment and a read count of the decided map data sub-segment. When the read count of the selected map data segment is greater than or equal to the read count of the decided map data sub-segment, the memory controller may determine not to delete the selected map data segment. When the read count of the selected map data segment is less than the read count of the decided map data sub-segment, the memory controller may determine to delete the selected map data segment.

At step S1207, the memory controller may generate information about a map data segment to be deleted among the map data segments in the host.

At step S1209, the memory controller may generate information about the map data sub-segment to be provided to the host.

At step S1211, the memory controller may provide host map update information to the host. In detail, when a read request or a write request is received from the host, the memory controller may provide a response including the host map update information to the host. The host map update information may include information about the map data sub-segment to be provided to the host and information about the map data segment to be deleted from the host.

At step S1213, the memory controller may provide the decided map data sub-segment to the host in response to a map data request received from the host.

Figure 13:
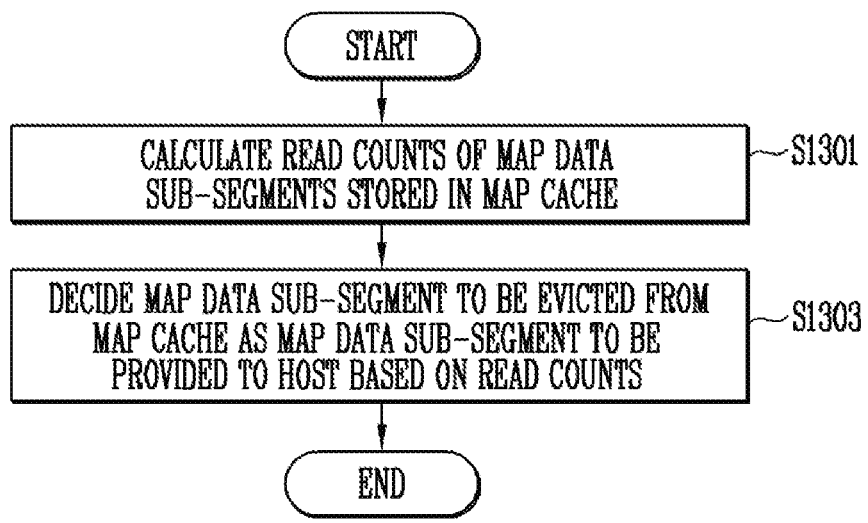
FIG. 13 is a flowchart illustrating an operation of determining a map data sub-segment to be provided in accordance with an embodiment.

FIG. 13 is a flowchart illustrating an operation of deciding a map data sub-segment to be provided in accordance with an embodiment. For example, the operation of FIG. 13 may be performed by the memory controller 200 of FIGS. 1 and 6.

Referring to FIG. 13, at step S1301, a memory controller may calculate read counts of respective map data sub-segments stored in a map cache.

At step S1303, the memory controller may decide a map data sub-segment to be evicted, that is, removed, from the map cache as a map data sub-segment to be provided to a host based on the read counts. In various embodiments, the memory controller may decide the map data sub-segment to be evicted from the map cache as the map data sub-segment to be provided to the host according to the least recently used (LRU) ranking policy.

Figure 14:
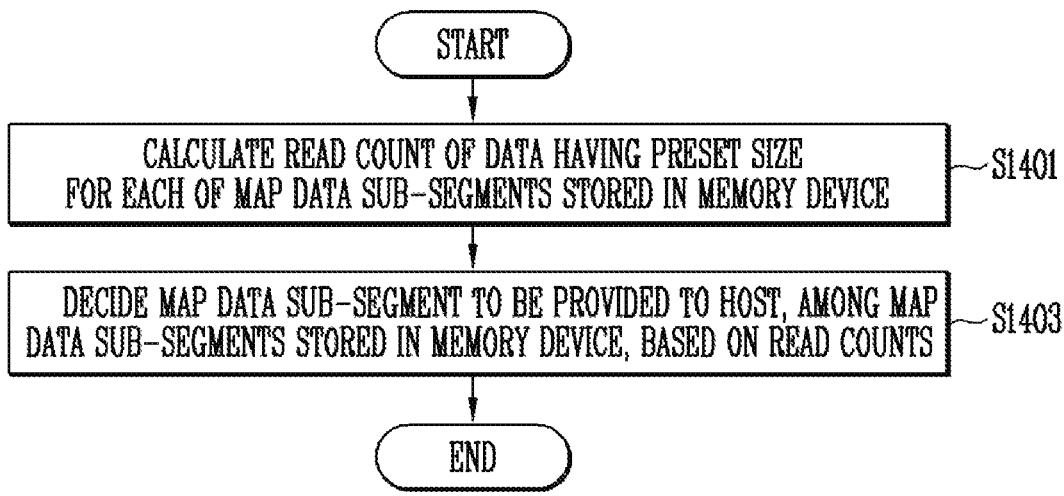
FIG. 14 is a flowchart illustrating an operation of determining a map data sub-segment to be provided in accordance with an embodiment.

FIG. 14 is a flowchart of an operation of deciding a map data sub-segment to be provided in accordance with an embodiment. For example, the operation of FIG. 14 may be performed by the memory controller 200 of FIGS. 1 and 6.

Referring to FIG. 14, at step S1401, a memory controller may calculate a read count for each of map data sub-segments stored in a memory device. The read count is the number of times that an operation of reading data having a preset size is performed. In detail, the read count may be the number of times that a read operation is performed on data having a preset size, among pieces of data stored at physical addresses in the corresponding map data sub-segment.

At step S1403, the memory controller may decide a map data sub-segment to be provided to the host, among the map data sub-segments in the memory device, based on the read counts.

Figure 15:
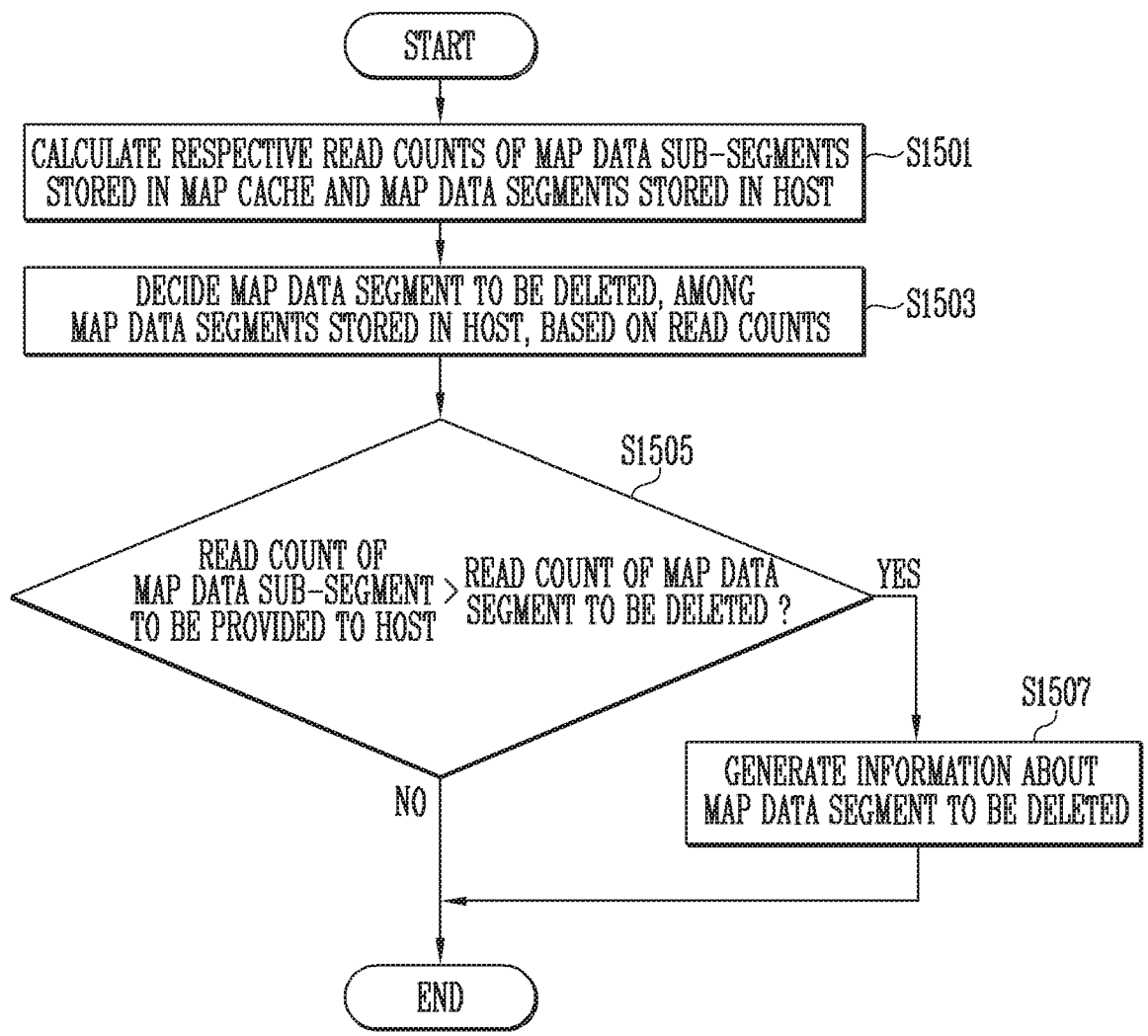
FIG. 15 is a flowchart illustrating an operation of generating information about a map data segment to be deleted in accordance with an embodiment.

FIG. 15 is a flowchart illustrating an operation of generating information about a map data segment to be deleted in accordance with an embodiment. For example, the operation of FIG. 15 may be performed by the memory controller 200 of FIGS. 1 and 6.

Referring to FIG. 15, at step S1501, a memory controller may calculate respective read counts of map data sub-segments in a map cache and map data segments in a host.

At step S1503, the memory controller may decide a map data segment to be deleted, among the map data segments stored in the host, based on the read counts.

At step S1505, the memory controller may determine whether the read count of the map data sub-segment to be provided to the host is greater than the read count of the map data segment to be deleted. When it is determined that the read count of the map data sub-segment is greater than the read count of the map data segment to be deleted, the memory controller proceeds to step S1507. When it is determined that the read count of the map data sub-segment is less than or equal to the read count of the map data segment to be deleted, the memory controller terminates the process.

At step S1507, the memory controller may generate information about the map data segment to be deleted.

Figure 16:
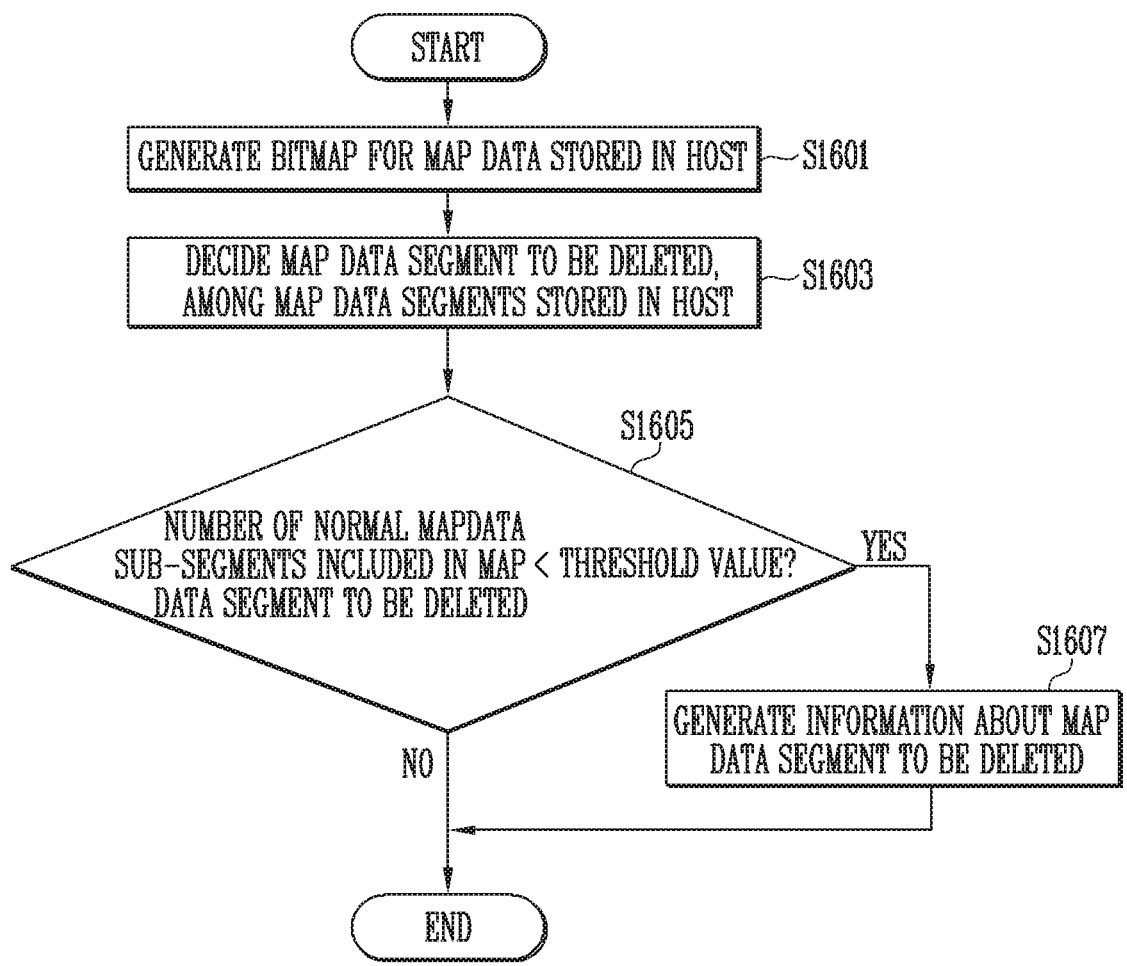
FIG. 16 is a flowchart illustrating an operation of generating information about a map data segment to be deleted in accordance with an embodiment.

FIG. 16 is a flowchart illustrating an operation of generating information about a map data segment to be deleted in accordance with an embodiment. For example, the operation of FIG. 16 may be performed by the memory controller 200 of FIGS. 1 and 6.

Referring to FIG. 16, at step S1601, a memory controller may generate a bitmap for map data stored in a host. In detail, the memory controller may generate host map state information. The host map state information includes bitmap information indicating whether map data sub-segments in each of map data segments stored in the host are normal map data sub-segments.

At step S1603, the memory controller may decide a map data segment to be deleted among the map data segments stored in the host, based on respective read counts of the map data segments stored in the host.

At step S1605, the memory controller may determine, based on the host map state information, whether the number of normal map data sub-segments in the map data segment to be deleted is less than a threshold value. The threshold value may be a preset number. When it is determined that the number of normal map data sub-segments is less than the threshold value, the memory controller proceeds to step S1607. Otherwise, the memory controller terminates the process.

At step S1607, the memory controller may generate information about the map data segment to be deleted.

Figure 17:
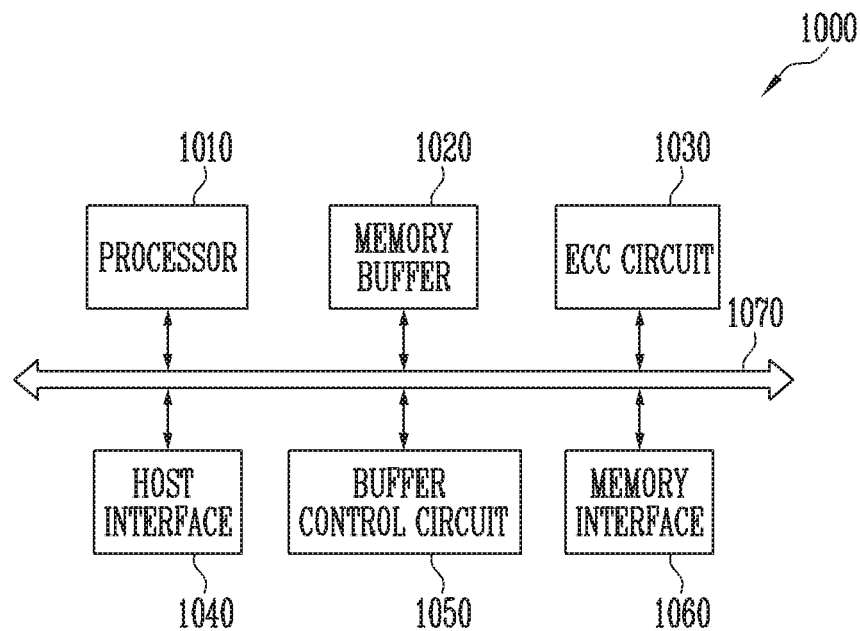
FIG. 17 is a diagram illustrating a memory controller of FIG. 1.

FIG. 17 is a diagram illustrating a memory controller 1000 as an example of the memory controller 200 of FIG. 1.

Referring to FIG. 17, the memory controller 1000 is coupled to a host (e.g., the host 300 of FIG. 1) and a memory device (e.g., the memory device 100 of FIG. 1). In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with the host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in a memory cell array (e.g., the memory cell array 110 of FIG. 2).

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform the randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as a component of the memory interface 1060 in the memory interface 1060.

The host interface 1040 may communicate with the host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit and receive commands, addresses, and data to and from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit host map update information such as commands or addresses in the memory controller 1000. The data bus and the control bus may be isolated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 18:
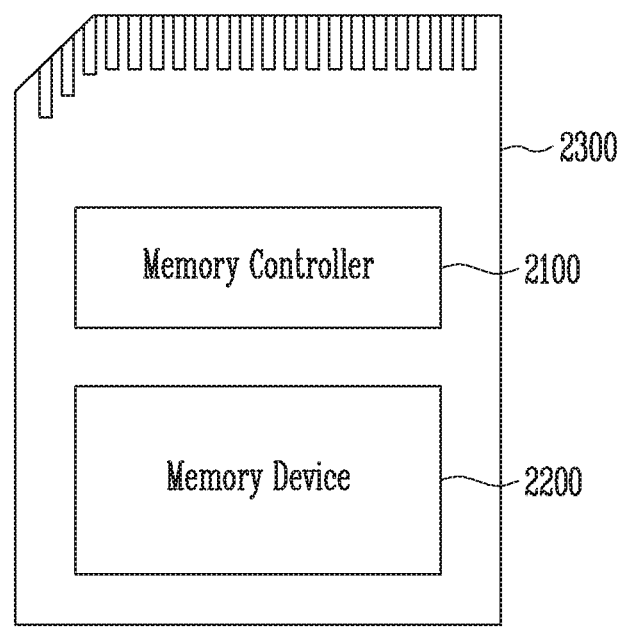
FIG. 18 is a block diagram illustrating a memory card system to which a storage device in accordance with an embodiment of the present disclosure is applied.

FIG. 18 is a block diagram illustrating a memory card system 2000 to which the storage device in accordance with an embodiment of the present disclosure is applied.

Referring to FIG. 18, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and an external device (e.g., the host 300 of FIG. 1). The memory controller 2100 may run firmware for controlling the memory device 2200. The memory controller 2100 may be implemented in the same way as the memory controller 200 described above with reference to FIG. 1.

In an embodiment, the memory controller 2100 may include components, such as a random access memory (RAM), a processor, a host interface, a memory interface, and an error correction code (ECC) circuit.

The memory controller 2100 may communicate with an external device through the connector 2300. The memory controller 2100 may communicate with the external device based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), a Spin-Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (e.g., a personal computer memory card international association (PCMCIA) card), a compact flash card (CF), a smart media card (e.g., SM or SMC), a memory stick, a multimedia card (e.g., MMC, RS-MMC, MMCmicro or eMMC), a secure digital (SD) card (e.g., SD, miniSD, microSD, or SDHC), or a universal flash storage (UFS).

Figure 19:
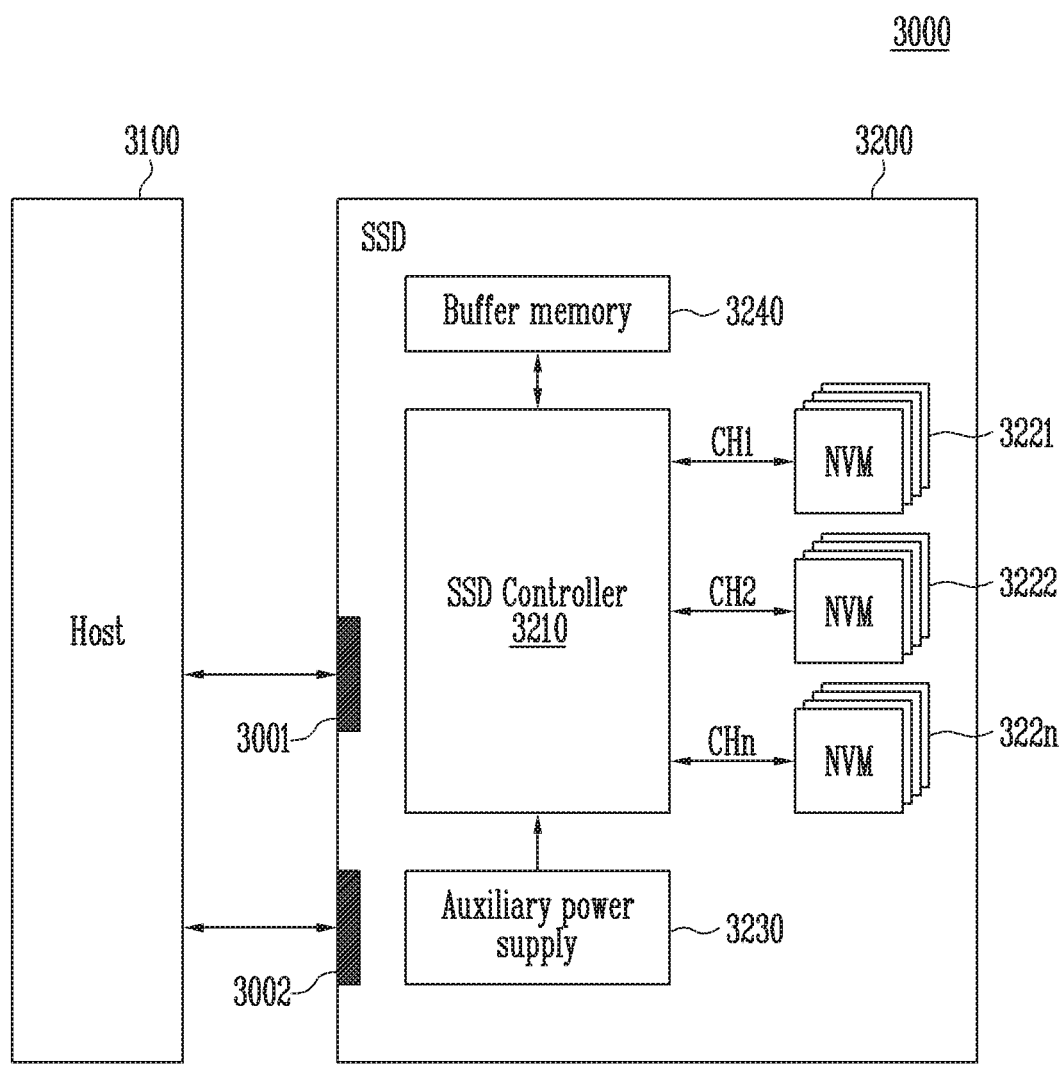
FIG. 19 is a block diagram illustrating an example of a solid state drive (SSD) system to which a storage device in accordance with an embodiment of the present disclosure is applied.

FIG. 19 is a block diagram illustrating a solid state drive (SSD) system 3000 to which the storage device in accordance with an embodiment of the present disclosure is applied.

Referring to FIG. 19, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), wireless fidelity (Wi-Fi), Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 20:
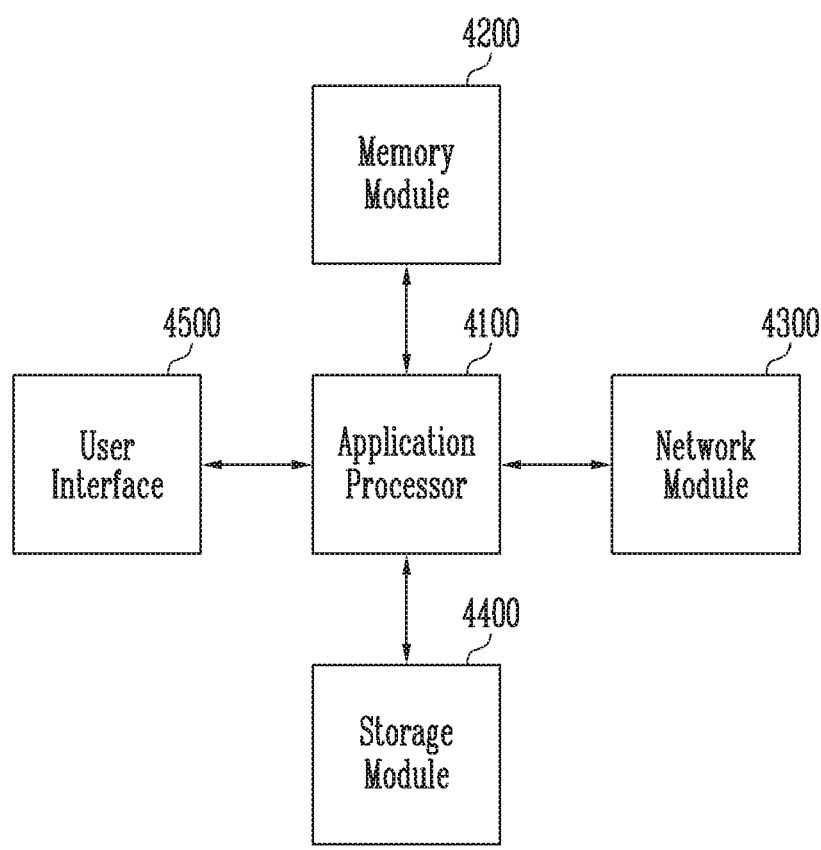
FIG. 20 is a block diagram illustrating a user system to which a storage device in accordance with an embodiment of the present disclosure is applied.

FIG. 20 is a block diagram illustrating a user system 4000 to which the storage device in accordance with an embodiment of the present disclosure is applied.

Referring to FIG. 20, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, and graphic engines for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (PoP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a memory controller that has improved map data access performance and a method of operating the memory controller.

While the exemplary embodiments of the present disclosure have been disclosed for illustrative purposes, those skilled in the art will appreciate that various modifications, additions and substitutions are possible. Therefore, the scope of the present disclosure must be defined by the appended claims and equivalents of the claims rather than by the description preceding them.

Although the embodiments of the present disclosure have been disclosed, those skilled in the art will appreciate that various modifications, additions and substitutions are possible, without departing from the scope and spirit of the present disclosure.

In the above-discussed embodiments, all steps may be selectively performed or skipped. In addition, the steps in each embodiment may not always be sequentially performed in given order, and may be randomly performed. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory controller of a storage device for controlling a memory device in the storage device, the memory device including a plurality of areas, wherein each of the plurality of areas includes a plurality of sub-areas and each of map data segments includes a plurality of map data sub-segments indicating map information on the plurality of sub-areas, the memory controller comprising:
    a map cache configured to store one or more map data sub-segments; and
    a map data manager in communication with a host, and configured to generate information about a map data sub-segment to be stored in a host memory of the host and generate information about a map data segment to be deleted from the host memory,
    wherein the map data sub-segment is selected among the one or more map data sub-segments stored in the map cache based on a read count for each of the plurality of sub-areas,
    wherein the map data segment is selected among one or more map data segments stored in the host memory based on status for the host memory and the read count, and
    wherein a unit of storing the map data sub-segment in the host memory is different from a unit of deleting the map data segment in the host memory.

2. The memory controller according to claim 1, wherein the map data manager comprises:
    a map management information processor configured to generate map cache management information including read counts of the one or more map data sub-segments and host map management information including read counts of the one or more map data segments, and to update the map cache management information and the host map management information when a read request is received from the host;
    a map management information storage configured to store the map cache management information and the host map management information; and
    a map data processor configured to determine a map data sub-segment that is removed from the map cache and selected as the map data sub-segment to be stored in the host memory based on the map cache management information, and to generate information about the map data sub-segment to be stored.

3. The memory controller according to claim 2, wherein the map data processor is configured to, when the number of map data segments stored in the host memory is equal to a threshold value, generate the information about the map data segment to be deleted.

4. The memory controller according to claim 3, wherein the map data processor is configured to, when a read count of the map data sub-segment to be stored is greater than a read count of the map data segment to be deleted, generate information about the map data segment to be deleted.

5. The memory controller according to claim 4, wherein the map data segment to be deleted is a map data segment having a lowest read count, among the one or more map data segments.

6. The memory controller according to claim 3, wherein:
    the map management information processor is configured to generate host map state information indicating whether map data sub-segments corresponding to each of the one or more map data segments are normal map data sub-segments, and to update the host map state information when the map data sub-segment to be stored is stored in the host memory, or when the map data segment to be deleted is deleted from the host memory, or when a normal map data sub-segment stored in the host memory is changed to a dirty map data sub-segment, and
    the map management information storage is configured to store the host map state information.

7. The memory controller according to claim 6, wherein the host map state information includes bitmap information in which a logical value indicating the normal map data sub-segment is opposite to a logical value indicating the dirty map data sub-segment or an empty map data sub-segment.

8. The memory controller according to claim 6, wherein the map data processor is configured to generate the information about the map data segment to be deleted when a read count of the map data sub-segment to be stored is greater than a read count of the map data segment to be deleted and when the number of normal map data sub-segments included in the map data segment to be deleted is less than a preset number.

9. The memory controller according to claim 1, wherein the map data manager comprises:
    a map management information processor configured to generate memory device map management information including respective read counts of the plurality of map data sub-segments and host map management information including read counts of the one or more map data segments and to update the memory device map management information when a read request is received from the host;
    a map management information storage configured to store the memory device map management information; and
    a map data processor configured to determine the map data sub-segment to be stored based on the memory device map management information and to generate information about the map data sub-segment to be stored.

10. The memory controller according to claim 9, wherein each of the read counts includes the number of times that a read operation performed on data having a preset size, among pieces of data stored at physical addresses included in a corresponding map data sub-segment, is counted.

11. The memory controller according to claim 10, wherein the map data processor is configured to select a map data sub-segment having a read count greater than a preset number of times, as the map data sub-segment to be stored.

12. The memory controller according to claim 11, wherein the map data processor is configured to select a map data sub-segment having a highest read count, among the plurality of map data sub-segments, as the map data sub-segment to be stored.

13. The memory controller according to claim 10, wherein the map data processor is configured to, when the number of map data segments stored in the host memory is equal to a threshold value, generate the information about the map data segment to be deleted.

14. The memory controller according to claim 13, wherein the map data processor is configured to, when a read count of the map data sub-segment to be stored is greater than a read count of the map data segment to be deleted, generate information about the map data segment to be deleted.

15. The memory controller according to claim 14, wherein the map data segment to be deleted includes a map data segment having a lowest read count, among the one or more map data segments.

16. The memory controller according to claim 13, wherein:
the map management information processor is configured to generate host map state information indicating whether map data sub-segments corresponding to each of the one or more map data segments are normal map data sub-segments, and to update the host map state information when the map data sub-segment to be stored is stored in the host memory, or when the map data segment to be deleted is deleted from the host memory, or when a normal map data sub-segment stored in the host memory is changed to a dirty map data sub-segment, and
the map management information storage is configured to store the host map state information.

17. The memory controller according to claim 16, wherein the host map state information includes bitmap information in which a logical value indicating the normal map data sub-segment is opposite to a logical value indicating the dirty map data sub-segment or an empty map data sub-segment.

18. The memory controller according to claim 16, wherein the map data processor is configured to generate the information about the map data segment to be deleted when a read count of the map data sub-segment to be stored is greater than a read count of the map data segment to be deleted and when the number of normal map data sub-segments included in the map data segment to be deleted is less than a preset number.

19. The memory controller according to claim 1, wherein:
the map data manager is configured to provide a response including host map update information to the host when a read request or a write request is received from the host, and
the host map update information includes at least one of the information about the map data sub-segment to be stored and the information about the map data segment to be deleted.

20. The memory controller according to claim 1, wherein the map data manager is configured to provide the map data sub-segment in response to a map data request received from the host.

21. A method of operating a memory controller of a storage device in communication with a host, the memory controller controlling a memory device in the storage device and including a map cache, wherein each of a plurality of areas in the memory device includes a plurality of sub-areas and each of map data segments includes a plurality of map data sub-segments indicating map information on the plurality of sub-areas, the method comprising:
generating information about a map data sub-segment to be stored in a host memory of the host among one or more map data sub-segments stored in the map cache, based on a read count for the memory device; and
generating information about a map data segment to be deleted from the host memory, among one or more map data segments stored in the host memory, based on the read count for the memory device and status for the host memory,
wherein a unit of storing the map data sub-segment in the host memory is different from a unit of deleting the map data segment in the host memory.

22. The method according to claim 21, further comprising:
providing the host with host map update information including at least one of the information about the map data sub-segment to be stored and the information about the map data segment to be deleted.

23. The method according to claim 22, wherein the generating of the information about the map data sub-segment to be stored comprises:
determining the map data sub-segment to be stored based on read counts of the one or more map data sub-segments.

24. The method according to claim 23, wherein the generating of the information about the map data segment to be deleted comprises:
determining whether the number of map data segments stored in the host memory is equal to a threshold value; and
when the number of stored map data segments is equal to the threshold value, comparing a read count of the map data sub-segment to be stored with a read count of the map data segment to be deleted,
wherein, when the read count of the map data sub-segment to be stored is greater than the read count of the map data segment to be deleted, the information about the map data segment to be deleted is generated.

25. The method according to claim 22, wherein:
the generating of the information about the map data sub-segment to be stored comprises selecting the map data sub-segment to be stored based on respective read counts of the map data segments, and
each of the read counts includes the number of times that a read operation performed on data having a preset size, among pieces of data stored at physical addresses included in a corresponding map data sub-segment, is counted.

26. The method according to claim 25, wherein the generating of the information about the map data segment to be deleted comprises:
determining whether the number of map data segments stored in the host memory is equal to a threshold value; and
when the number of stored map data segments is equal to the threshold value, comparing a read count of the map data sub-segment to be stored with a read count of the map data segment to be deleted, wherein, when the read count of the map data sub-segment to be stored is greater than the read count of the map data segment to be deleted, the information about the map data segment to be deleted is generated.

27. The method according to claim 22, wherein the providing of the host with the host map update information comprises providing a response including the host map update information to the host when a write request or a read request is received from the host.

28. The method according to claim 27, further comprising:
providing the host with the map data sub-segment to be stored in response to a map data request received from the host.

29. A computing system comprising:
a storage device including a controller and a memory device including a plurality of areas; and
a host in communication with the storage device and including a host memory, wherein the controller comprises:
a map cache configured to store a plurality of map data corresponding to the plurality of areas; and
a map data manager configured to determine at least one first map data among the plurality of map data stored in the map cache as map data to be stored in the host memory and determine at least one second map data among multiple map data stored in the host memory as map data to be deleted, based on a read count for each of the plurality of areas and a capacity of the host memory,
wherein a unit of the first map data is different from a unit of the second map data.

* * * * *